(12) United States Patent
Alonichau et al.

(10) Patent No.: US 12,013,913 B2
(45) Date of Patent: Jun. 18, 2024

(54) CLASSIFYING PARTS OF A MARKUP LANGUAGE DOCUMENT, AND APPLICATIONS THEREOF

(71) Applicant: Microsoft Technology Licensing, LLC, Redmond, WA (US)

(72) Inventors: Siarhei Alonichau, Seattle, WA (US); Saksham Gupta, Bothell, WA (US); Aliaksei Bondarionok, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 17/528,215

(22) Filed: Nov. 17, 2021

(65) Prior Publication Data

US 2023/0153370 A1    May 18, 2023

(51) Int. Cl.
| | | |
|---|---|---|
| *G06F 16/90* | (2019.01) | |
| *G06F 16/954* | (2019.01) | |
| *G06F 16/955* | (2019.01) | |
| *G06F 40/221* | (2020.01) | |
| *G06F 40/284* | (2020.01) | |
| *G06F 40/20* | (2020.01) | |

(52) U.S. Cl.
CPC ........ *G06F 16/9558* (2019.01); *G06F 16/954* (2019.01); *G06F 40/221* (2020.01); *G06F 40/284* (2020.01)

(58) Field of Classification Search
CPC .......................... G06F 16/9558; G06F 16/954
See application file for complete search history.

(56) References Cited

U.S. PATENT DOCUMENTS

| | | | |
|---|---|---|---|
| 8,078,625 B1* | 12/2011 | Zhang ................... | G06F 16/353 |
| | | | 707/952 |
| 2008/0104113 A1* | 5/2008 | Wong .................. | G06F 16/9535 |
| 2009/0210406 A1 | 8/2009 | Freire et al. | |

OTHER PUBLICATIONS

"Web crawler," available at https://en.wikipedia.org/w/index.php?title=Web_crawler&oldid=1026645009, Wikipedia article, Jun. 3, 2021, 16 pages.
Dai, et al., "Bridging Link and Query Intent to Enhance Web Search," in HT '11: Proceedings of the 22nd ACM Conference on Hypertext and Hypermedia, Jun. 2011, pp. 17-26.

(Continued)

*Primary Examiner* — Kristopher Andersen

(57) ABSTRACT

A link-analyzing system (LAS) extracts information from a markup language (ML) document associated with a web page link. In some implementations, the information that is extracted includes at least: a) address content that is part of the link's destination address; and b) text that is associated with the link but that is not part of the destination address itself. The LAS generates feature information based on the address content and the text, and then uses a classification model to make a classification assessment for the link based on the feature information. In some implementations, the LAS can control a crawling engine based on the classification assessment. In some implementations, the LAS can revise a low-confidence classification assessment based on an examination of the classification assessments of a group of similar links described by the ML document. Other implementations use the above-described functionality to classify other parts of an ML document.

20 Claims, 12 Drawing Sheets

(56) References Cited

OTHER PUBLICATIONS

PCT Search Report and Written Opinion for PCT/US2022/041790, mailing on Nov. 22, 2022, 16 pages.
Alonichau, et al., "Inferring Informaiton about a Webpage Based Upon a Uniform Resource Locator of the Webpage," U.S. Appl. No. 17/168,665, filed Feb. 5, 2021, 36 pages.
Alonichau, et al., "Determining that a Resource is SPAM Based on a Uniform Resource Locator of the Webpage," U.S. Appl. No. 17/359,474, filed Jun. 25, 2021, 38 pages.

* cited by examiner

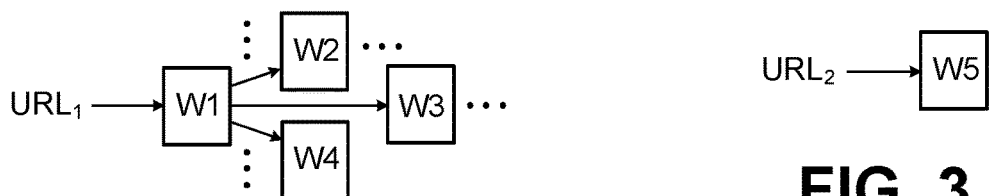
FIG. 2
FIG. 3
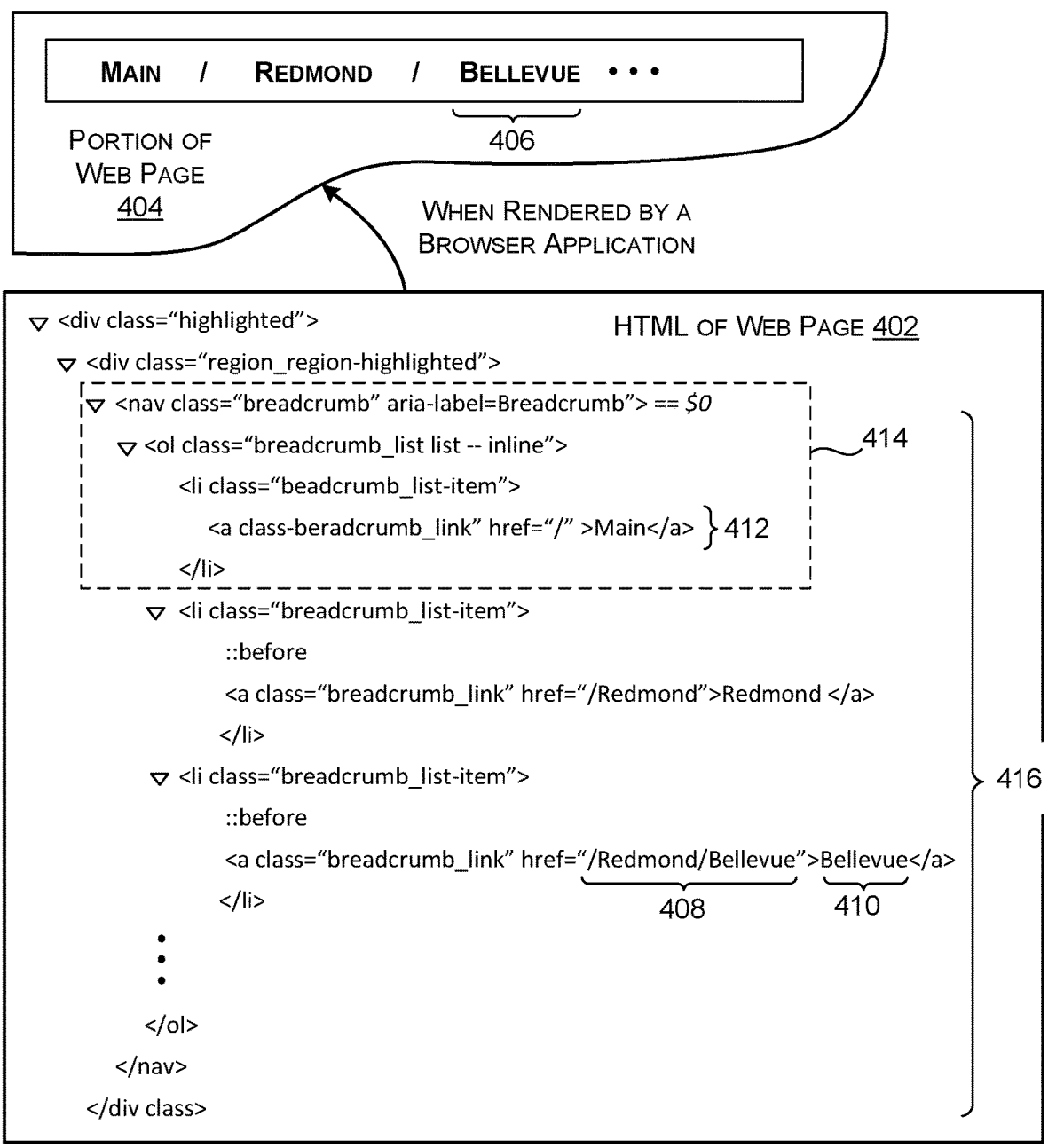
FIG. 4

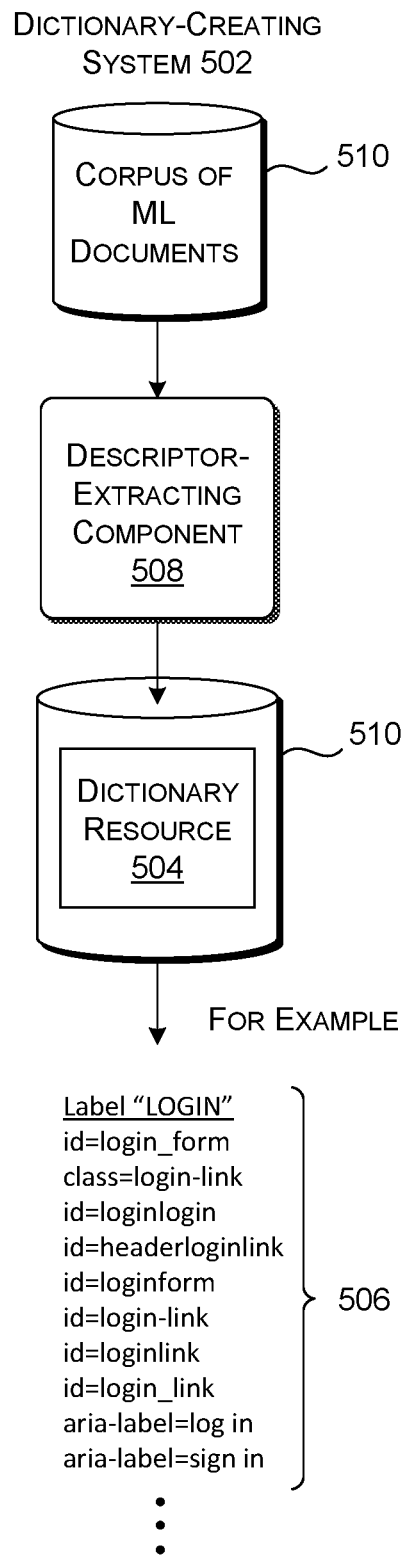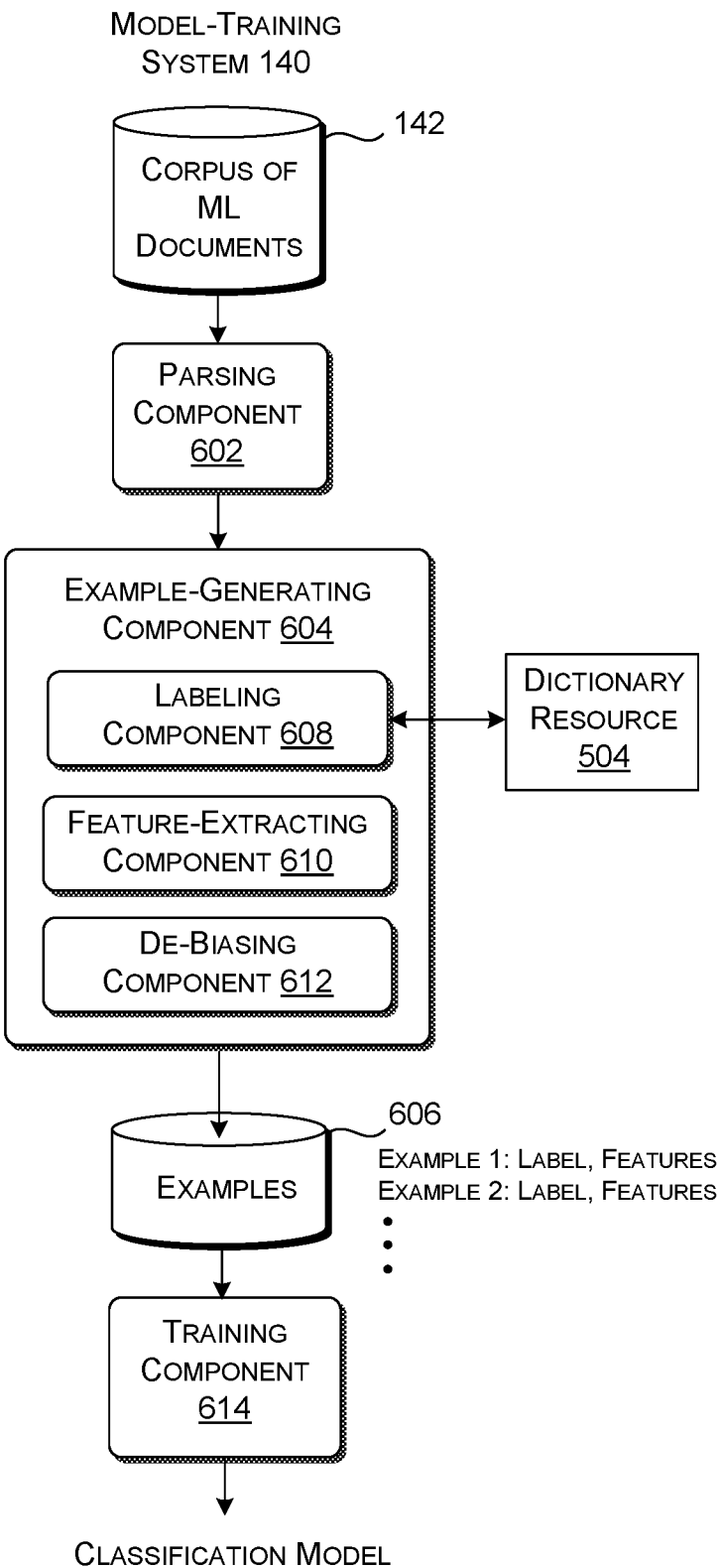
FIG. 5
FIG. 6

OVERVIEW OF OPERATION OF THE LINK-ANALYZING SYSTEM 1102

OBTAIN A MARKUP LANGUAGE (ML) DOCUMENT OF A GIVEN WEB PAGE THAT CONTAINS A LINK THAT INCLUDES A DESTINATION ADDRESS OF A NETWORK-ACCESSIBLE RESOURCE.
1104

OBTAIN PARSED CONTENTS BY PARSING THE ML DOCUMENT.
1106

IDENTIFY ADDRESS CONTENT FROM THE PARSED CONTENTS, THE ADDRESS CONTENTS CORRESPONDING TO AT LEAST A PORTION OF THE DESTINATION ADDRESS.
1108

IDENTIFY TEXT FROM THE PARSED CONTENTS THAT HAS A PRESCRIBED RELATION TO THE LINK, TO PROVIDE IDENTIFIED TEXT THAT IS NOT PART OF THE DESTINATION ADDRESS.
1110

PRODUCE FEATURE INFORMATION THAT DESCRIBES A COMBINATION OF AT LEAST THE ADDRESS CONTENT AND THE IDENTIFIED TEXT.
1112

MAP THE FEATURE INFORMATION TO A CLASSIFICATION ASSESSMENT USING A MACHINE-TRAINED CLASSIFICATION MODEL, THE CLASSIFICATION ASSESSMENT INCLUDING A CLASSIFICATION CATEGORY OF THE LINK AND A CONFIDENCE LEVEL ASSOCIATED THEREWITH.
1114

PERFORM AN APPLICATION-SPECIFIC ACTION DIRECTED TO THE LINK THAT IS BASED ON THE CLASSIFICATION ASSESSMENT.
1116

FIG. 11

MODEL-TRAINING PROCESS 1402

USE THE DICTIONARY RESOURCE TO ASSIGN LABELS TO LINKS DESCRIBED IN A CORPUS OF ML DOCUMENTS, EACH LABEL IDENTIFYING A PARTICULAR CLASSIFICATION CATEGORY.
1404

EXTRACT FEATURE INFORMATION FOR EACH LINK THAT IS LABELED.
1406

PRODUCE TRAINING EXAMPLES FOR THE LINKS DESCRIBED IN THE CORPUS OF ML DOCUMENTS, THE TRAINING EXAMPLES INCLUDING AT LEAST THE LABELS AND THE FEATURE INFORMATION THAT HAS BEEN EXTRACTED.
1408

TRAIN THE CLASSIFICATION MODEL BASED ON THE TRAINING EXAMPLES.
1410

FIG. 14

MODEL-TRAINING PROCESS 1602

AUTOMATICALLY APPLY LABELS TO PARTS-OF-INTEREST IN A CORPUS OF ML DOCUMENTS USING THE DICTIONARY RESOURCE, TO PRODUCE LABELED ML DOCUMENTS.
1604

TRAIN THE CLASSIFICATION MODEL BASED ON THE LABELED ML DOCUMENTS.
1606

CLASSIFYING PARTS OF A MARKUP LANGUAGE DOCUMENT, AND APPLICATIONS THEREOF

BACKGROUND

Applications that involve activating or otherwise interacting with web page links often perform data-intensive operations within application-specific limits. For example, a crawling operation involves accessing and analyzing a typically large number of new and modified web pages, typically within specified time-related and resource-related constraints. A provider of Internet services may face challenges in meeting these conditions. This factor challenges the ability of a provider of Internet services to keep timely advised of changes in the Web. Failure to meet crawling goals can have further downstream consequences. For example, this failure may negatively impact the quality of search results delivered by a search engine.

SUMMARY

A link-analyzing system (LAS) extracts information from a markup language (ML) document associated with a web page link. In some implementations, the information that is extracted includes at least: a) address content that is part of the link's destination address; and b) text that is associated with the link but that is not part of the destination address itself. For example, the extracted text may correspond to anchor text that the web page uses to alert a user to the presence of the link. The LAS generates feature information based on the address content and the text, and then uses a machine-trained classification model to make a classification assessment for the link based on the feature information. The classification assessment identifies a most likely category associated with the link. The category, in turn, identifies the type of resource that the link most likely points to, and/or the role of the link within the web page. The classification assessment also conveys a level of confidence associated with its prediction.

According to one non-limiting end use, the LAS can control a crawling engine based on the classification assessment. That is, upon determining that the classification assessment of a link meets a prescribed test, the LAS can instruct a crawling engine to crawl the web page to which the link points. The LAS can apply the test by determining whether the link has a type for which crawling is warranted, as opposed to a type of link for which crawling should not be performed. The LAS can further invokes the crawling operation for a link only if the classification assessment has a prescribed level of confidence associated with it.

According to some aspects, upon discovering that the classification assessment of a link does not meet the prescribed test, the LAS can reformulate the classification assessment based on additional factors. More specifically, the LAS can identify a group of other links in the ML document that have at least one characteristic in common with the current link under consideration. The LAS can then compute a revised classification assessment based on an aggregation (e.g., an average) of classification assessments of the links in the group.

Overall, the LAS can use its technique to increase the efficiency with which an application processes web pages containing links. For example, the technique can increase the efficiency with which the crawling engine discovers new links in the Word Wide Web ("Web"). That is, the LAS can guide the crawling engine to access those web pages that have the highest likelihood of discovering the greatest number of new links within a given amount of time and within a given expenditure of computing resources. Based on this guidance, the crawling engine can increase the number of meaningful new links it can discover within its resource-related and time-related budgets.

Also described herein is a training system for training the classification model used by the LAS. At the outset, a dictionary-creating system creates a dictionary resource by identifying descriptive terms that most commonly appear in a seed set of ML documents in proximity to descriptions of links of particular types. The dictionary resource produced thereby specifies a set of classification labels, and, for each classification label, a group of descriptive terms associated therewith. The training system then uses the dictionary resource to automatically apply classification labels to links that appear in other ML documents. It performs this task for each ML document by determining the descriptive terms contained within the ML document, and then using the dictionary resource to find the label with which these descriptive terms are most closely associated. This process enables the training system to produce a large number of training examples in a resource-efficient and time-efficient manner, e.g., by avoiding the need to manually apply labels to a large number of links. In a final operation, the training system trains the classification model based on the training examples it has generated in the above-summarized manner.

Other aspects of the systems and techniques described herein extend the above-described principles to classify other parts of an ML document, not limited to those parts describing links.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2 and 3 show two examples of a crawling operation. The example of FIG. 2 yields more new links compared to the example of FIG. 3.

FIG. 4 shows an example of a markup language (ML) document and a corresponding web page that is produced based on the ML document.

FIG. 5 shows an example of a dictionary-creating system, which produces a dictionary resource for use in the computing environment of FIG. 1.

FIG. 6 shows an example of a training system that produces a classification model for use by the computing environment of FIG. 1.

FIG. 10 also shows a training technique for producing a machine-trained classification model for use by the part-analyzing system.

FIG. 11 is an example of a process by which the computing environment of FIG. 1 assigns a classification assessment to a particular link.

FIG. 14 is an example of a process by which the computing environment of FIG. 1 can train the classification model.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a training system for producing a classification model. Section A also describes systems for using the classification model to apply labels to links and/or other parts of markup language (ML) documents. Section B sets forth illustrative methods that explain the operation of the various systems of Section A. Section C describes illustrative computing functionality that can be used to implement any aspect of the features described in Sections A and B.

A. Illustrative Computing Systems

Section A begins by describing computing systems for automatically applying labels to links in ML documents. Section A also describes computing systems for training classification models that are used to apply the labels. Note, however, that the principles set forth herein can be applied to the labeling of other parts of ML documents, and to the training of the classification models that perform this labeling. Hence, the following introductory explanation of the link-labeling technology is to be understood as presented in the spirit of illustration, not limitation. Technology for classifying other parts of the ML documents (including links, but not limited to links) will be described at the end of Section A, in conjunction with the explanation of FIG. 10.

Figure 1:
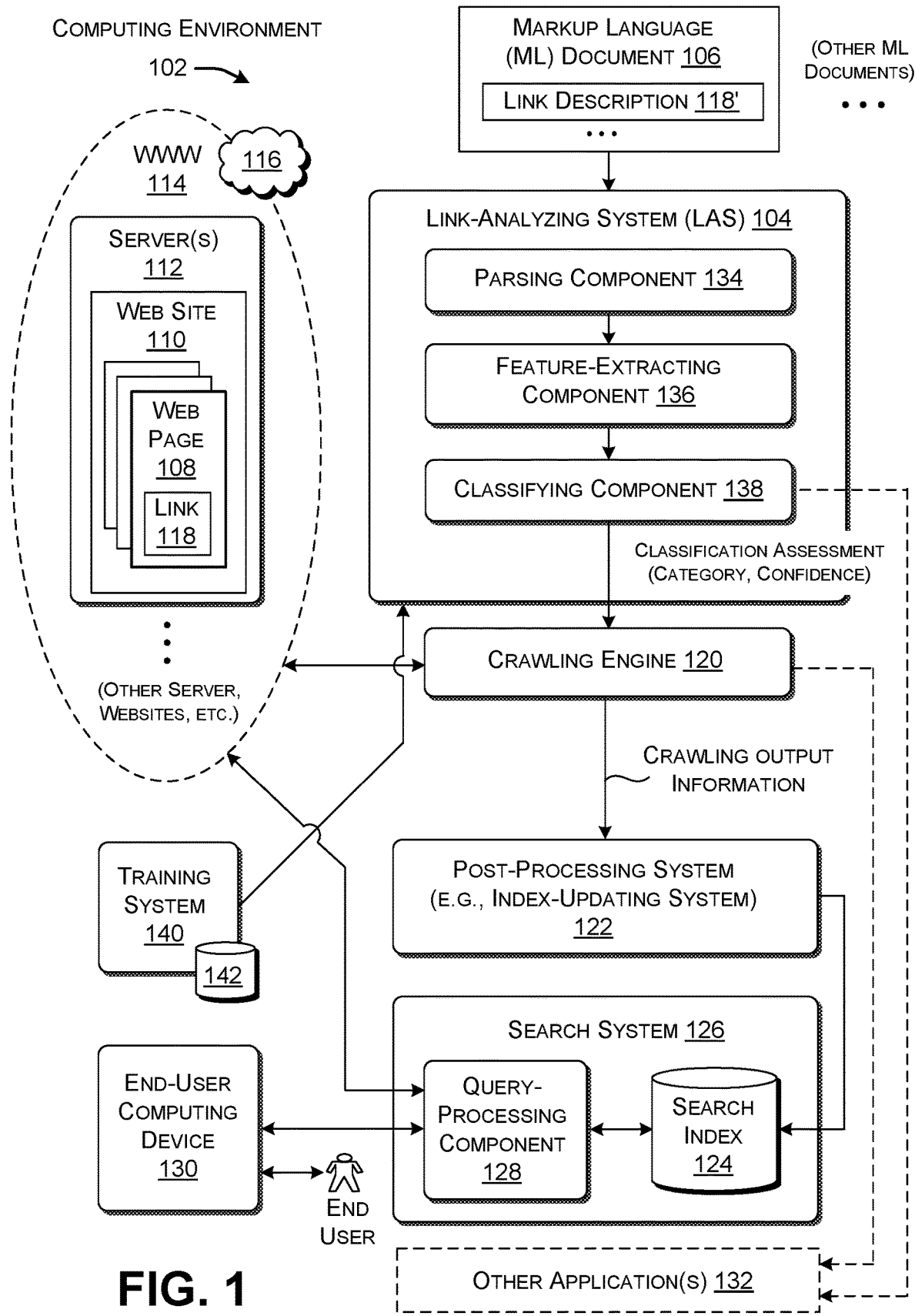
FIG. 1 shows an illustrative computing environment in which web pages provided by the World Wide Web ("Web") are processed in an efficient manner.

FIG. 1 shows an illustrative computing environment 102 including a link-analyzing system (LAS) 104 for analyzing an ML document 106. The ML document 106 describes the content of a web page 108 using a markup language, such as the Hypertext Markup Language (HTML). The web page 108 may be part of a website 110 having one or more other pages. One or more servers 112 host the website 110. The website 110 is part of the Word Wide Web ("Web") 114 which runs on the Internet 116 or other computing network.

Assume that the web page 108 has at least one link 118. When the web activated, the browser application will direct a user to network-accessible content associated with the link 118. In some cases, the link 118 may specifically direct the user to another web page that is part of the website 110. In other cases, the link 118 may direct the user to a resource that is "outside" of the website 110. For example, the link 118 may direct the user to a web page provided by another website. The ML document 106 contains a description of the link 118, which is referred to below as an ML link description 118'.

The link 118 can be formulated in different ways. In one implementation, the link 118 corresponds to a hyperlink defined by the HTML standard. In that context, the ML document 106 can identify the link description 118' using an "<a>" tag. One part of the link description 118' is a destination address that specifies a network-accessible location to which a user will be directed when he or she clicks on the link 118 in the browser application. In the HTML standard, the ML document 106 can identify the destination address using the "href=" attribute.

Advancing momentarily to FIG. 4, this figure shows an HTML document 402 that, when rendered by a browser application (not shown), produces a web page 404, a portion of which is shown in FIG. 4. Assume that the web page 404 is part of a website. Different links in the web page 404 point to other web pages of the website. For example, when activated, the link associated with the anchor text "Bellevue" 406 directs a user to another web page of the website relating to the topic of "Bellevue." The HTML document 402 specifies the destination address of this link in field 408, and the anchor text associated with this link in the field 410.

Returning to FIG. 1, the purpose of the LAS 104 is to generate a classification assessment for the link 118. The classification assessment describes a classification category that is most likely associated with the link 118. That is, in some implementations, the classification category describes the type of resource to which the link 118 points and/or the role of the link 118 within the web page 108. The classification assessment also describes a level of confidence associated with its classification of the link 118. More specifically, in some implementations, the LAS 104 can generate confidence levels for plural respective possible classification categories. The classification category having the highest confidence level (which can be determined using an argmax operator) identifies the category of the link 118 that is determined to be most likely.

Different applications can leverage the LAS 104 to assist the applications in processing links in web pages. According to some non-limiting implementations, the LAS 104 assigns a classification category to the link 118 that has a bearing on whether it is appropriate for a crawling engine 120 to crawl the link 118. In this application environment, the computing environment 102 includes decision logic (not shown in FIG. 1) that determines whether the crawling engine 120 should perform a crawling operation for the link 118 based on the classification assessment produced by the LAS 104 for the link 118. More specifically, the decision logic makes its decision on the basis of the classification category that is determined to be most likely, and the level of confidence associated therewith.

In some cases, the LAS 104 incorporates the decision logic. Here, upon making a decision using the decision logic, the LAS 104 can forward appropriate instructions to the crawling engine 120. Alternatively, or in addition, the crawling engine 120 implements the decision logic. Here, the decision logic of the crawling engine 120 makes its decision upon received the classification assessment from the LAS 104. In other implementations, the decision logic is implemented, at least in part, by some other component(s) of the computing environment 102.

The crawling engine 120 responds to an instruction to commence a crawling operation by activating the link 118 and loading a target web page to which the link 118 points. The target web page activated by the link 118 may itself include one or more other links. The crawling engine 120 can activate these links upon discovering them. More generally, the crawling engine 120 can follow a chain of links of any prescribed depth, depending on how the crawling operation is configured.

To better convey the advantage of selectively crawling some links (compared to other links), consider FIGS. 2 and 3, which show two different crawling operations performed by the crawling engine 120. In the first crawling operation of FIG. 2, the crawling engine 120 activates a $URL_1$ to load a web page W1. The web page W1, in turn, includes links that point to at least three other web pages (W2, W3, and W4). The crawling engine 120 proceeds to load those pages (W2, W3, and W4). Any of these pages, in turn, can lead to the discovery of additional linked pages (not shown). In contrast, in the second crawling operation of FIG. 3, the crawling engine 120 activates a $URL_2$ to load a web page W5. Assume that the web page W5 does not include any links that point to any other web pages. This means that the crawling engine's process of discovery for $URL_2$ ends with the loading of the web page W5.

Note that the crawling engine 120 is capable of discovering more links when activating the kind of seed link $URL_1$ shown in FIG. 2, compared to the kind of seed link $URL_2$ shown in FIG. 3. The decision logic of the computing environment 102 leverages the above observation by favoring activation of the kinds of discovery-rich links shown in FIG. 2 compared to the kinds of discovery-poor links shown in FIG. 3. Metaphorically speaking, the decision logic promotes thoroughfare-type links that lead to many other links, as opposed to dead-end-type links that stall further discovery.

Returning to FIG. 1, in some non-limiting implementations, the LAS 104 chooses the most likely classification category of the link 118 from among the following non-limiting set of classification categories:

a) A "content" classification is used to identify links that point to content-bearing web pages. For example, a first web page may include a content-type link that points to a second page that provides additional information regarding a particular topic mentioned in the first page. In some cases, the second page may correspond to a terminal page of a website that does not itself point to other web pages. The first web page often includes a content-type link in a content-bearing section. For example, the content-bearing section may correspond to the body of article presented by the first web page. The anchor text of a content-type link often has a relatively rich description of the content to which it points, e.g., by including the title of an article to which it points.

b) A "navigation" classification in a web page identifies links that point to other parts of a website, of which the web page is a part. For example, a web page can include a link that directs a user to a homepage of the web page's website. The anchor text of a navigation-related link is often shorter than a content-related link, and its URL is often not unique. Other implementations can further distinguish among particular kinds of navigation-related links, such as by allocating a classification category to pagination-related links.

c) A "comments" classification identifies links that appear in user comments in a website and/or which otherwise have a role associated with the comments. For example a web page can include a link that points to a comment that appears in a comments section of a website. In another example, a comment that appears in the comments section can point to another comment in the same comments section.

d) A "social" classification identifies links that point to social network websites. For example, a web page may include a link that points to an entry provided by the FACEBOOK social network, the YOUTUBE social network, the TWITTER social network, etc. These types of links point outside of a website of which the web page is a part.

e) A "profile" classification identifies links that point to intra-site user profiles. For example, a web page of a website can include a profile-related link that points to the profile of a user who is associated with the website. A separate web page hosted by the website may provide this profile.

f) A "calendar" classification identifies links contained within electronic calendars and/or which point to event information within the electronic calendars or elsewhere in a website. For example, a web page can include a link that points to an event posted within an organization's online calendar.

g) A "login" classification identifies links that point to program functionality that enables users to enter credential information. For example, a web page can include a link that points to a web page of a website that enables a user to enter his or her user ID and password.

The computing environment 102 operates based on the premise that different categories of links are more productive than other categories of links in revealing new links. For example, a navigation-related link points from one page within a website to another page in the same website. This kind of link is therefore useful in filling out a site map for the website. On the other hand, a comment-related link points to comment-related content within a website, which is generally not important in discovering the overall structure of a website. Comment-related content is also information that is less useful to capture in a search system's index (compared, e.g., to content-bearing pages). A content-related link points to network-accessible content, and is generally more useful than a comment-related link. In some cases, however, a content-related link may point to a terminal web page that does not contain further links, and therefore may be less useful than a navigation-related link in exploring the structure of a website. Note that the propensity of a link to yield productive discovery of new links is ultimately an empirical issue. Hence, a developer, operating in a particular information environment, can rank different categories of links based on their observed ability to promote efficient discover of new links. The developer can then produce a ranking table that ranks the discovery-related value of the classification categories. The developer can also provide handcrafted rules that control what actions are performed upon encountering different classification categories.

The above list of classification categories is set forth in the spirit of illustration, not limitation. Other implementations can include additional classification categories not mentioned above. In addition, or alternatively, other implementations can omit one or more classification categories mentioned above. More generally, note that different applications can classify links to serve different respective application-specific purposes; these applications can accordingly use different sets of classification categories that complement their different respective purposes.

By virtue of the above strategy, the crawling engine 120 can increase the number of meaningful links that it discovers within an allotted amount of crawling time. The crawling engine 120 can also reduce its overall consumption of resources in performing the crawling operation. These gains in efficiencies are significant because the number of new web pages introduced to the Web 114 is typically vast at any given time, and the crawling operation that is used to find these new links can generally be characterized as an "expensive" operation from the standpoint of resource consumption and crawl-time metrics. The improvement to the crawling efficiency described above also improves the performance of downstream applications (to be described below).

A post-processing system 122 can perform any application-specific action based on information collected by the crawling operation. For example, the post-processing system 122 can create an index entry for each new web page that it discovers, or for each new web page that meets specified criteria. The post-processing system 122 can perform this task by generating feature information that describes the new web page. The post-processing system 122 can then produce an index entry that includes the URL of the new web page along with its feature information. Finally, the post-processing system 122 can add this new index entry to a search index 124 provided by a search system 126.

The search system 126 includes a query-processing component 128 that receives a query submitted by a user via a browser application of a user computing device 130. It searches the search index 124 to find a set of documents that match the user's query. It then compiles a search results page that identifies the matching documents, and sends that search results page to the user. The computing environment 102 can improve the quality of the search results by performing an efficient crawling operation. This is because an efficient crawling operation increases the chances that the search index 124 describes the most relevant web pages accessible via the Web 114 at any given time. Stated in the negative, an efficient crawling operation decreases the chances that the search index 124 will omit a relevant web page that would have matched the user's query, e.g., because the crawling engine 120 could not discover this web page in the amount time and computing resources which were allotted to the crawling operation.

FIG. 1 also shows that one or more other applications 132 can make use of the results provided by the crawling engine 120. For example, a knowledgebase application (not shown) can use the results provided by the crawling engine 120 to update a knowledge structure. In another case, an application can use the classification assessment provided by the LAS 104 to determine whether it is appropriate to invoke the link 118 in the course of an end user's interaction with the web page 108.

Now referring to the LAS 104 itself, this system may receive the ML document 106 from any source, such as the server(s) 112 that host the web page 108 described by the ML document 106. The LAS 104 can request the ML document 106 from the server(s) 112. Alternatively, or in addition, the server(s) 112 can independently forward the ML document 106 to the LAS 104.

The LAS 104 may perform its analysis in a pipeline of stages. A parsing component 134 uses known parsing technology to parse the ML document 106 into its constituent parts. For example, the parsing component 134 can perform this task based on a data store of parsing rules, e.g., some of which can be structured as IF-THEN rules. Alternatively, or in addition, the parsing component 134 can use a machine-trained model to perform the parsing. The parsing component 134 yields parsed contents that express the constituent parts of the ML document 106. In some cases, the parsing component 134 formulates the parsed contents as a hierarchical tree of elements, e.g. using a Document Object Model (DOM) representation of the ML document 106.

A feature-extracting component 136 extracts feature information that describes salient parts of the ML document 106. The operation of the feature-extracting component 136 will be fully described below in connection with FIGS. 7 and 8. By way of introduction to that later explanation, the feature-extracting component 136 can extract at least two pieces of information regarding the link 118 under consideration. As a first piece of information, the feature-extracting component 136 extracts address content that represents at least a portion of the link's destination address. As a second piece of information, the feature-extracting component 136 extracts information conveyed by the ML document 106 that is associated with the link 118, but is not a part of the link's destination address itself. For example, the second piece of information may correspond to the anchor text associated with the link 118. Variations in the composition of the feature information will be set forth below when describing FIGS. 7 and 8.

A classifying component 138 maps the feature information into the classification assessment using a machine-trained classification model. As previously stated, the classifying component 138 can identify levels of confidence for different respective classification categories. The classification category having the highest level of confidence identifies the most likely category of the link 118. Additional information regarding the operation of the classifying component 138 is provided below in the context of the explanation of FIG. 9.

A training system 140 produces the classification model based on a corpus of training examples in a data store 142. Additional information regarding the operation of the training system 140 is provided below in the context of the explanation of FIG. 6.

Advancing to FIG. 5, this figure shows an example of a dictionary-creating system 502 which produces a dictionary resource 504 for use in the training system 140 of FIG. 1. The dictionary resource 504 includes a set of descriptive terms that commonly appear in ML documents in prescribed proximity to links of particular kinds (e.g., content-related links, navigation-related links, comment-related links, etc.). For example, for the classification category "login," the dictionary-creating system 502 identifies a list 506 of descriptive terms chosen by authors of web pages in login-related sections of ML documents. More specifically, these are terms that commonly appear in proximity to login-type links in the ML documents.

To produce the dictionary resource 504, a descriptor-extracting component 508 extracts descriptive terms from ML documents that appear in the documents in prescribed relation to link descriptions having known classifications. For example, again consider the example of FIG. 4. Assume that a link description in line 412 in the HTML document 402 has a known classification, such as "navigation." For instance, a human analyst may have previously specified the classification of this link description. The descriptor-extracting component 508 begins by identifying a region-of-analysis that includes the line 412. For example, the descriptor-extracting component 508 defines a block 414 of ML information that is bounded at its top by an ancestor node that is a prescribed number (e.g., three) of levels "up" from the node associated with the line 412, within a hierarchy of levels defined by the HTML document 402. The descriptor-extracting component 508 can then extract descriptive terms within this block 414 that have any one of a predetermined set of prefixes, such as, without limitation, "class=", "id=", "itemtype=", "role=", "aria-label", etc. For example, the descriptor-extracting component 508 will extract the descriptive term "class=breadcrumb_list-item" as one such candidate because it includes the prefix "class=".

Upon performing the above analysis for all of the link descriptions in the ML documents, the descriptor-extracting component 508 can then identify the descriptive terms that are most frequently used in relation to links of each particular type. For example, for the classification category "login," the descriptor-extracting component 508 identifies the descriptive term "id=login form" as the most common descriptive term that appears in proximity to link descriptions having the "login" category. The descriptor-extracting component 508 stores the resultant dictionary resource 504 in a data store 510.

FIG. 6 shows an example of the training system 140 that produces the classification model based on ML documents in the data store 142. A parsing component 602 performs the same role as the parsing component 134 of FIG. 1. That is, the parsing component 602 partitions each ML document into its constituent parts. The parsing component 602 can produce parsed contents in the form of a DOM tree.

An example-generating component 604 produces training examples that are used to train the classification model, and stores the training examples in a data store 606. To perform this task, the example-generating component 604 performs plural sub-tasks. More specifically, a labeling component 608 automatically determines a label associated with each particular link under consideration using the dictionary resource 504 produced by the dictionary-creating system 502. To perform this task, the labeling component 608 can: (1) identify a link description in an ML document for the particular link under consideration; (2) identify a block of HTML content in the ML document that includes the identified link description; and (3) identify the descriptive terms having predetermined prefixes within the identified block (e.g., the prefixes of "class=", "id=", "itemtype=", "role=", "aria-label", etc.). Again, FIG. 4 shows an example of a block 414 that encompasses a link description in line 412, having an upper bound that is a prescribed number of levels "up" from the link description in line 412. After identifying the descriptive terms in the block, the labeling component 608 can consult the dictionary resource 504 to determine the classification category that is most closely associated with the descriptive terms. The labeling component 608 can perform matching in any manner, e.g., by using one or more manually-crafted matching rules, by using any type of voting algorithm, by using a machine-trained matching model, etc. The labeling component 608 can then assign the label associated with the identified classification category to the particular link. For example, the labeling component 608 will assign the classification category of "login" if it concludes that the block under consideration includes a prescribed number of the descriptive terms in the list 506 (of FIG. 5).

A feature-extracting component 610 performs a similar role to the feature-extracting component 136 of FIG. 1. That is, the feature-extracting component 610 produces feature information for each link under consideration. As will be described below, in some implementations, the feature-extracting component 610 can extract first feature information that expresses at least a portion of the destination address associated with the link. The feature-extracting component 610 can extract second feature information that expresses the anchor text associated with the link.

The example-generating component 604 produces a set of training examples as a result of its analysis. Each training example includes at least feature information associated with the particular link (produced by the feature-extracting component 610) and a label associated with the particular link (produced by the labeling component 608). A de-biasing component 612 normalizes the examples that are produced by the example-generating component 604 by host and by classification category. For example, the de-biasing component 612 can limit the number of training examples it produces per host (e.g., per website) to a prescribed maximum number (e.g., one to three thousand examples). The de-biasing component 612 can also limit the number of training examples it produces per classification category to a prescribed maximum number (e.g., two to five hundred million examples). The de-biasing component 612 can restrict training examples based on yet additional criteria, including, but not limited to: natural language, website subject matter, regional affiliation of website, organizational affiliation of website, etc.

The normalization operation performed by the de-biasing component 112 reduces the chances that the classification model produced by the training system 140 will unduly favor the naming conventions of any particular website and/or any particular classification category. For example, the normalization operation will prevent one or more large book-seller websites from unduly influencing the interpretation of product-related descriptive terms. In addition, or alternatively, the normalization operation can prevent errors and ambiguities in term usage that may be present in one or more websites from unduly affecting the interpretation of descriptive terms across a broader collection of websites. In addition, or alternatively, the normalization operation can prevent descriptive terms in any single natural language from unduly influencing the interpretation of descriptive terms across a broader collection of multilingual websites (presuming that the ML documents in the data store 140 include multilingual text).

A training component 614 performs machine-training based on the training examples in the data store 606. The training component 614 can produce any type of classification model, such as a logistic regression model, a support vector machine (SVM) model, a random forest classification model, a transformer-based model, a convolutional neural network (CNN) model, a recurrent neural network (RNN) model, a FastText classification model, and so on. The training component 614 can perform training using any technique, such as back projection in conjunction with stochastic gradient descent. The training component 614 applies a training objective that attempts to minimize an aggregate difference between predicted labels and ground-truth labels for the training examples.

Overall, the training system 140 provides a way for a developer to apply labels to a large number of ML documents without requiring the developer to manually label these documents. The training system 140 achieves this result by using the dictionary resource 504. It is true that the dictionary-creating system 502 may operate based on a seed set of ML documents that include manually-labeled links. But the set of ML documents that are automatically labeled by the training system 140 can be much larger than the number of ML documents that are used to produce the dictionary resource 504. In this sense, the training system 140 can be said to produce the classification model based on sparsely-annotated ML documents.

As a result of the above-described characteristics, the training system 140 can reduce the amount of time and computing resources that are required to produce the classification model. The training system 140 can also leverage the dictionary resource 502 to increase the number of training examples that it uses to produce the classification model, which, in turn, may result in the generation of a robust classification model.

Figure 7:
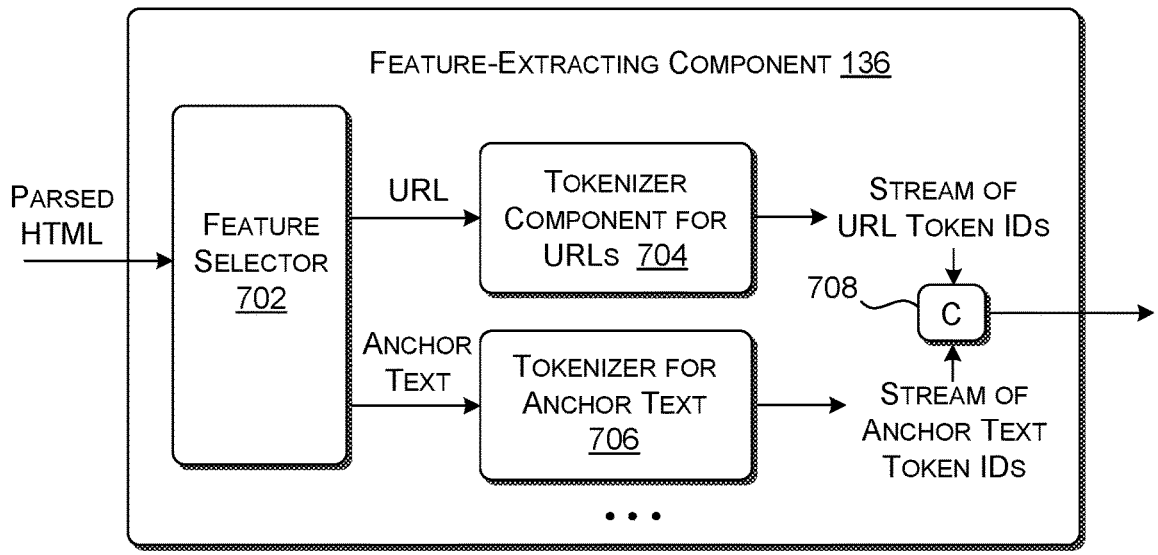
FIG. 7 shows an example of a feature-extracting component for producing tokenized feature information.

FIG. 7 shows an illustrative implementation of the feature-extracting component 136 of the computing environment 102 of FIG. 1. The explanation given for FIG. 7 also applies to the feature-extracting component 610 used by the training system 140 of FIG. 6. In general, the feature-extracting component 136 serves the role of extracting feature information for a link under consideration, as described by an ML document. The feature-extracting component 136 will be explained in the context of a particular link description 802 shown in FIG. 8. Assume that the link description 802 is a part of a more encompassing ML document (not shown).

A feature-selector 702 extracts portions of the parsed contents that will be used to construct the feature information. For example, with reference to FIG. 8, the feature-selector 702 extracts a portion of the destination address associated with a link under consideration, referred to herein as address content 804. More specifically, assume that the destination address in its entirety includes a first absolute portion (e.g., "https://example.com") that identifies a website, and a second relative portion (e.g., "/specials/space-science") that identifies a particular web page within the website. (Note that the particular example of FIG. 8 omits the first portion of the destination address.) The feature-selector 702 can be configured to extract the second relative portion of the destination address, and discard the first absolute portion of the destination address.

As a second piece of feature information, the feature-selector 702 can extract the anchor text 806 specified in the link description 802. To repeat, the anchor text 806 is the text that the web page uses to reveal the presence of a link. A user can click on the text to activate the "underlying" link. Here in FIG. 8, the anchor text 806 contains the text "Space+ Science."

In its entirety, the feature selector 702 produces extracted feature information 808 that includes the extracted address content 804 concatenated with the anchor text 806. The feature selector 702 inserts a delimiter token "A" 810 between the address content 804 and the anchor text 806 so that the classifying component 138 can readily distinguish between the two.

A first tokenizer 704 converts the address content 804 into a first sequence of token identifiers 812. A second tokenizer 706 converts the anchor text 806 into a second sequence of token identifiers 814. Each tokenizer can use any mapping technology to convert parts of input text into corresponding token identifiers. For example, the first tokenizer 704 can use any type of n-gram model to produce the first sequence of token identifiers 812. This n-gram language model is trained on a corpus of destination address information. The second tokenizer 706 can likewise use any type of n-gram model to produce the second sequence of token identifiers 814. This n-gram language model is trained on a corpus of multi-lingual text information of any type (such as a corpus of sentences, phrases, anchor text examples, etc.). In some non-limiting implementations, both of the tokenizers (704, 706) use a unigram language model having a vocabulary of 250K text fragments (i.e., sub-words), although the composition of the two vocabularies differs. In a unigram model, the probability of occurrence of any token ID in a sequence is assumed to be independent of the occurrence of any other token ID in the sequence.

Consider the operation of a unigram language model. A unigram language model can process a piece of text under consideration by successively attempting to match text fragments of the text with token IDs that best describe the text, expanding the sequence of token IDs as it proceeds. At any given point, the probability associated with a proposed sequence of token IDs is given by the product of the probabilities of is constituent token IDs. Upon completion of processing, the unigram language model will have identified the sequence of token IDs having the highest probability. Each tokenizer can use any type of algorithm to progress through its search space of possible token sequences, such as the BEAM search algorithm. Other implementations can produce the sequence of token IDs using other techniques besides a unigram model. For example, other implementations can use a transformer-based neural network, an RNN, etc. to map a piece of text into a sequence of token IDs. Alternatively, or in addition, the tokenizers (704, 706) can use a combination of different types of n-gram models.

A combination component 708 of the feature-extracting component 136 produces tokenized feature information 816 that includes the first sequence of token identifiers 812 concatenated with the second sequence of token identifiers 814, separated by the delimiter token 810. The combination component 708 can optionally add delimiter tokens (818, 820, 822) to the respective ends of the token identifiers in the second sequence of token identifiers 814; this information assists the classifying component 138 in interpreting the tokenized feature information 816.

Figure 8:
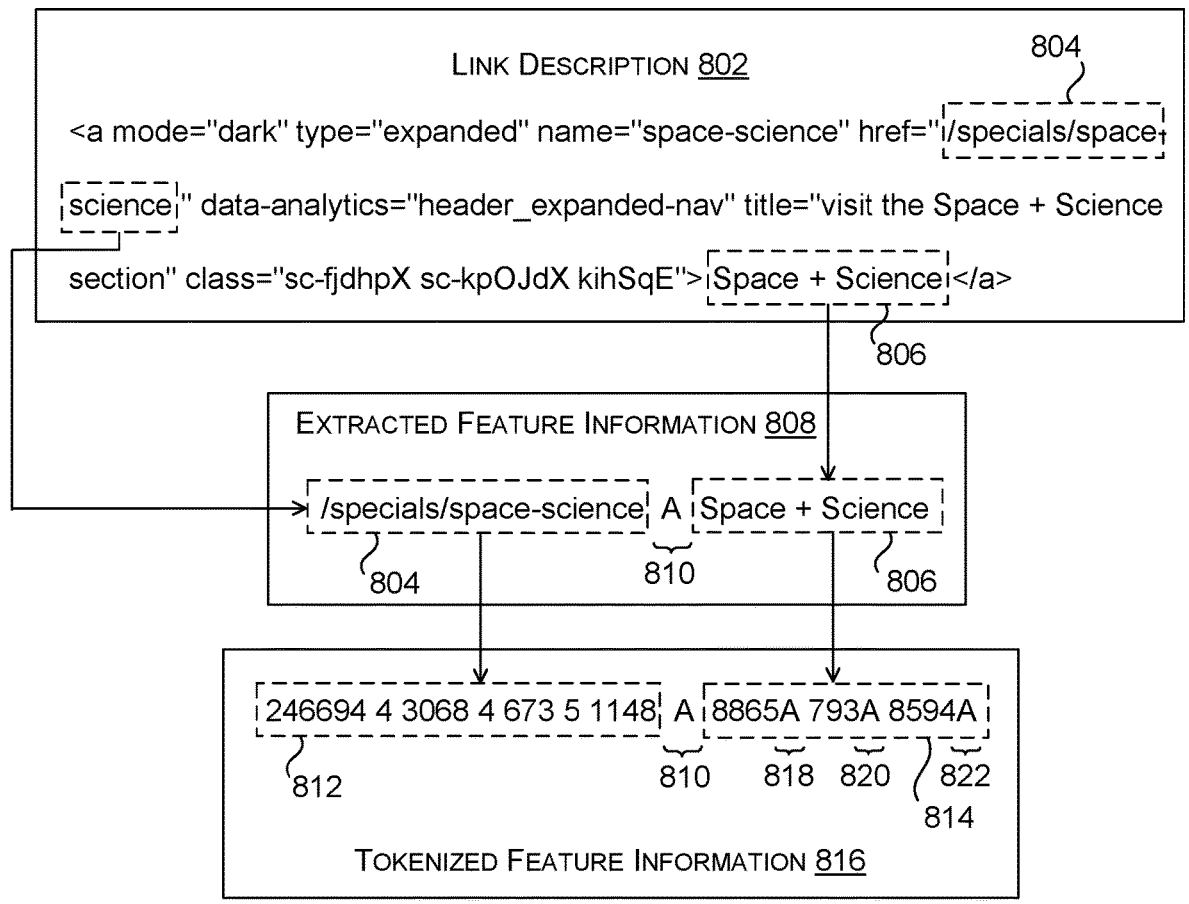
FIG. 8 shows an example of the type of transformation performed by the feature-extracting component of FIG. 7.

The implementation of FIG. 8 should be interpreted in the spirit of illustration, not limitation. In addition, or alternatively, other implementations can extract other information from an ML document that may have a bearing on the nature of a link under consideration. For example, other implementations can extract header-related information that appears in the ML document in prescribed proximity to a link description under consideration. Other implementations can extract comment-related information that appears in the ML document in prescribed proximity to a link description under consideration, and so on.

Figure 9:
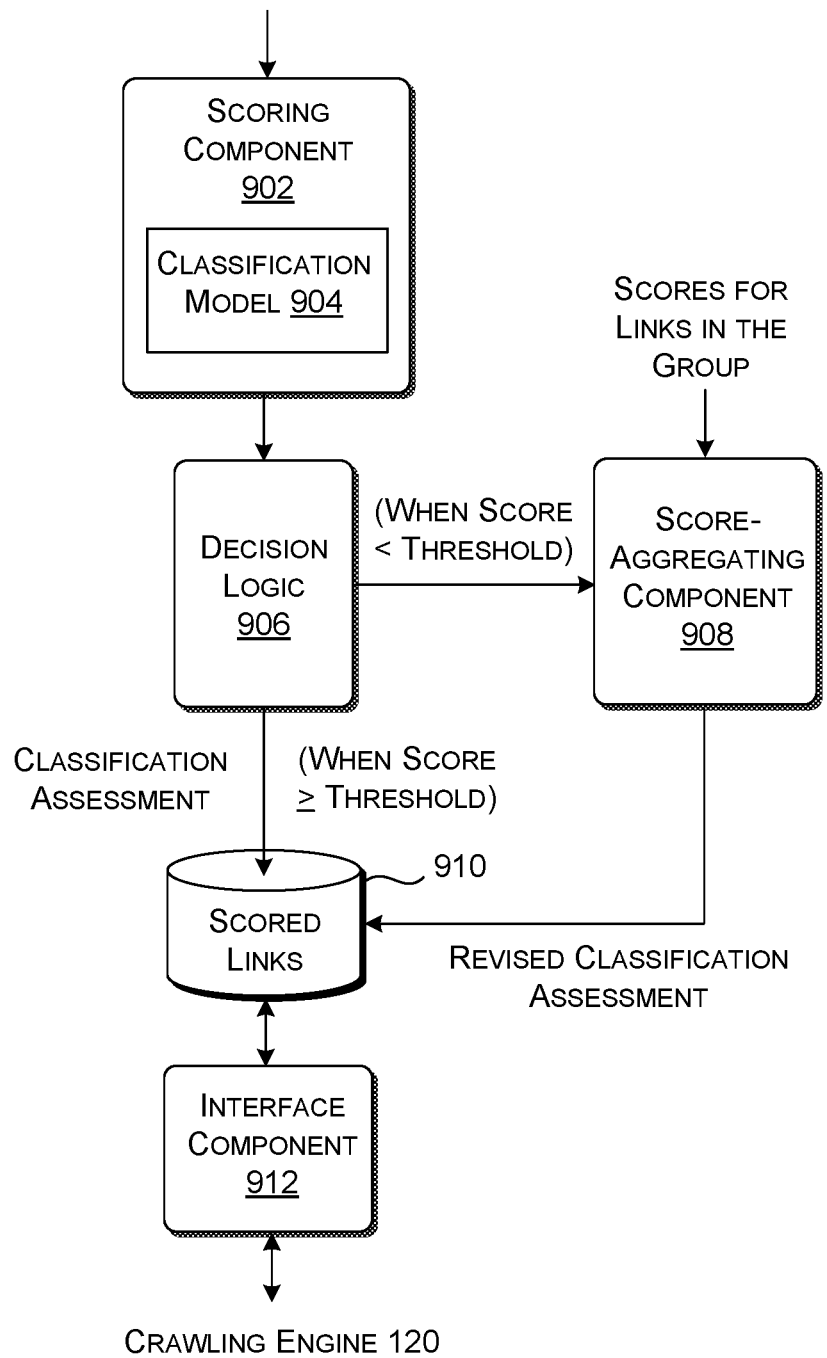
FIG. 9 shows an example of a classifying component for use in the computing environment of FIG. 1. The classifying component assigns classification assessments to identified links.

FIG. 9 shows an example of the classifying component 138 introduced in FIG. 1. The classifying component 138 uses the classification model produced by the training system 140 of FIG. 6 to generate a classification assessment for a link under consideration.

More specifically, a scoring component 902 uses a machine-trained classification model 904 to map tokenized feature information for the link under consideration to a classification assessment. In some implementations, the scoring component 902 specifically identifies a level of confidence for each classification category, such as a first confidence level for the "content" category, a second confidence level for the "navigation" category, a third confidence level for the "comments" category, and so on. This type of output therefore can be said to implicitly identify the classification category that the link most likely belongs to, along with the level of confidence associated therewith. In other words, the most likely classification category corresponds to the category having the highest confidence level.

As noted above, the classification model 904 can be implemented using any type of technology. Without limitation, in some implementations, the classification model 904 is implemented as a FastText classifier. A FastText classifier is a bag-of-words classifier that operates by mapping the input token IDs into internal vectors. The FastText classifier can average the internal vectors to produce an aggregate vector. It can then apply a softmax function (a normalized exponential function) to the aggregate vector to determine the probabilities that the link under consideration corresponds each possible classification category. Another classifier can use a transformer-based classifier to produce scores for the different classification categories. For example, the transformer-based classifier can map the sequence of token IDs produced by the feature-extracting component 136, along with a special CLS token, to hidden state information. A softmax component can use the hidden-state counterpart of the CLS token to determine output probabilities for the different classification categories.

Decision logic 906 interprets the classification assessment produced by the scoring component 902. Based on its interpretation, the decision logic 906 generates instructions for the crawling engine 120. For example, the decision logic 906 can determine whether the classification assessment pertains to a category for which crawling should be performed. If this test is met, the decision logic 906 determines whether the level of confidence associated with the classification assessment exceeds a prescribed category-specific threshold value. If this test is satisfied, the decision logic 906 can send instructions to the crawling engine 120, which command it to perform crawling for the link under consideration. The decision logic 906 will not instruct the crawling engine 120 to perform a crawling operation if the link is determined to be a kind of link for which crawling is not warranted. For example, the decision logic 906 will not instruct the crawling engine 120 to perform crawling if it is determined that the link most likely is a comment-related link.

Assume that the decision logic 906 determines that the link has a classification category for which crawling should be performed, but the confidence level associated with this conclusion is below the prescribed threshold level. To address this situation, the decision logic 906 can invoke a score-aggregating component 908 to generate a revised classification assessment for the link. The score-aggregating component 908 commences this process by identifying a group of other links in the ML document that share at least one characteristic with the link under consideration. For example, the score-aggregating component 908 can use one or more XPATH expressions to identify a group of links in the ML document that serve a similar role within a web page. (XPATH refers to technology used to locate elements in a markup language document by progressing through the document, starting from its root node, guided by the parts of the XPATH expression.) The score-aggregating component 908 can then aggregate the classification assessments for the links in the identified group (including the original classification assessment for the link under consideration). This yields a surrogate or revised classification assessment that the score-aggregating component 908 assigns to the link under consideration, instead of the original classification assessment.

Consider once again the example of FIG. 4. Assume that the objective of the classifying component 138 is to determine the classification category for the link that is described in the line 412 of the HTML document 402. Further assume that the classifying component 138 determines that this link most likely corresponds to a navigation-type link, but it cannot make this prediction with sufficient confidence. To address this situation, the score-aggregating component 908 identifies the group of links that appear in a portion 416 of ML document. These links share a common characteristic because they all pertain to navigational links that appear in the same menu section of the web page 404. The score-aggregating component 908 can aggregate the classification assessments of these related links to generate a revised classification assessment for the link under consideration, which will replace the original classification assessment for the link.

The score-aggregating component 908 can perform aggregation in different ways. In some implementations, the score-aggregating component 908 averages the classification scores for links in the group that share the same category, to generate the revised classification assessment. The revised classification assessment will have a higher confidence level than the original confidence level insofar the average confidence level of the group is higher than the original confidence level. In other implementations, the score-aggregating component 908 can adopt any type of voting protocol to arrive at the revised classification assessment. Still other aggregation algorithms are possible.

In some implementations, the score-aggregating component 908 only takes into consideration classification assessments in the group that are above a prescribed threshold. This threshold may be different (e.g., lower) than the assessment that is used by the decision logic 906 to determine whether to invoke the score-aggregating component 906. The score-aggregating component 908 can also restrict its aggregation to the most prevalent classification category in the group, e.g., by excluding classification categories that do not agree with the most common classification category in the group.

The classifying component 138 stores the classification assessments for the links it has analyzed in a data store 910. In some implementations, the crawling engine 120 performs crawling for any link having a level of confidence above the prescribed threshold. To implement this provision, an interface component 912 can send instructions to the classifying engine 120 to carry out the appropriate crawling operations. Alternatively, the crawling engine 120 can independently interrogate the data store 910 via the interface component 912 to determine what links should be crawled.

Note that FIG. 9 indicates that the decision logic 906 is part of the classifying component 138. Alternatively, or in addition, the crawling system 120 can incorporate the decision logic 906. In that alternative implementation, the crawling system 120 receives the classification assessment computed by the classifying component 138. It then performs the testing (and potentially aggregating) functions described above. Further note that the decision logic 906 was explained in the context of a crawling operation performed by the computing environment 102. But the computing environment 102 can also apply the decision logic 906 to other applications. That is, more generally stated, the computing environment 102 can use the decision logic 906 to determine whether an application-specific action should be performed that is directed to a link in a web page.

In conclusion to Section A, other implementations of the computing environment 102 can extend the principles set forth herein to other parts of the web page 108 (e.g., besides link-related elements of the web page 108). For example, other implementations can use the principles set forth herein to classify any part-of-interest in the ML document 106 based on identified features associated with the part-of-interest provided in the ML document 106. For instance, consider a comment-related section of the web page 108 described by a comments-related portion of the ML document 106. The comment-related portion constitutes a part-of-interest. Assume that this part-of-interest includes some text that appears in the web page 108 (such as heading information), as well as other descriptive information that does not have a direct counterpart in the information presented in the web page 108. A part-analyzing system can classify this section of the web page 108 under consideration as a comments-related section based on both types of evidence (e.g., based on text that appears in the web page and the other descriptive content).

Figure 10:
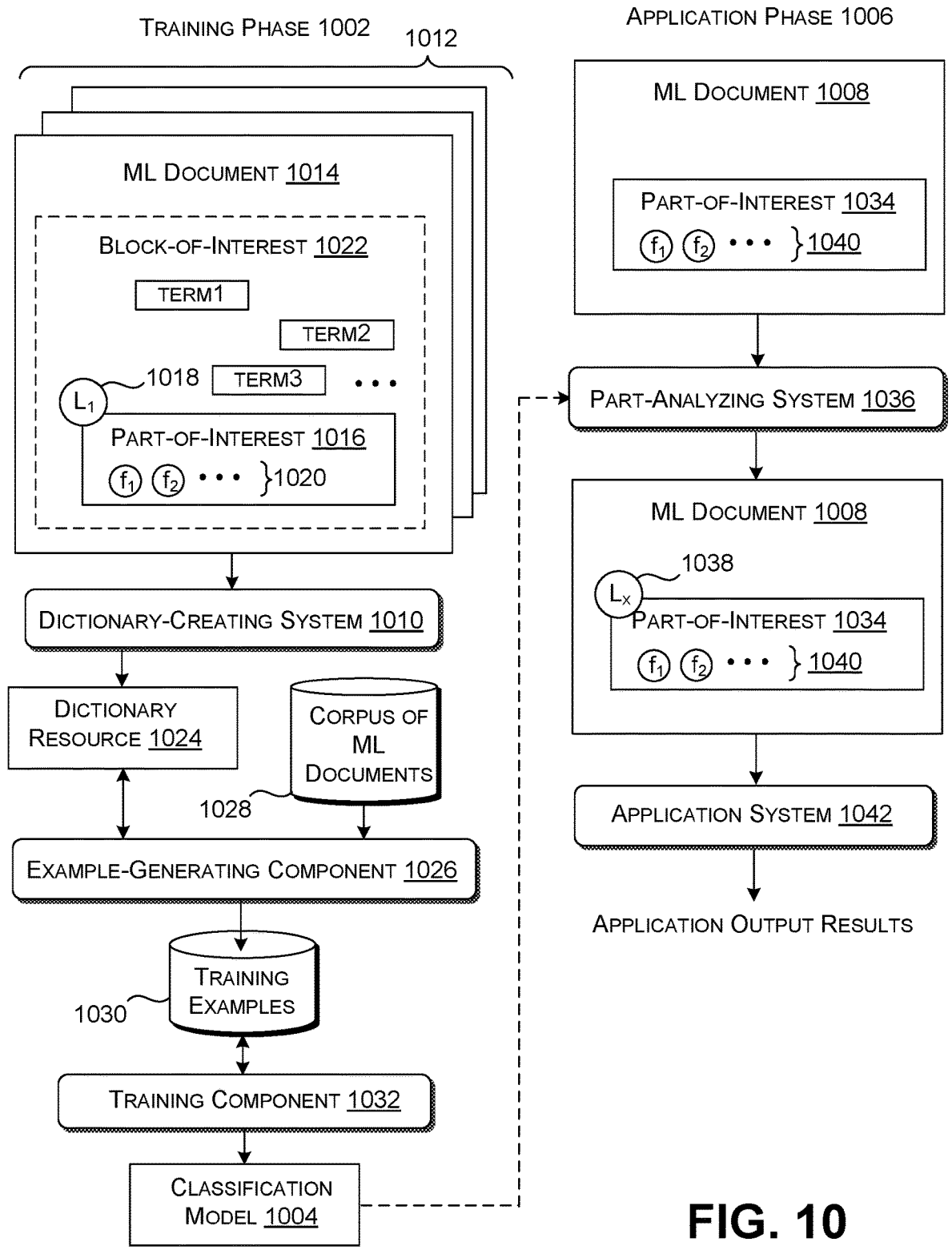
FIG. 10 shows a part-analyzing system that extends the principles set forth in connection with FIGS. 1-9 to the automatic labeling of other parts of an ML document, not limited to links in the ML document.

More specifically, FIG. 10 illustrates the extension of the principles set forth herein to the classification of other parts-of-interest in ML documents, not limited to links. FIG. 10 specifically shows a training phase 1002 that produces a classification model 1004, and an application phase 1006 that uses the classification model 1004 to classify a part-of-interest that appears in an input ML document 1008.

Referring first to the training phase 1002, a dictionary-creating system 1010 receives a corpus of seed ML documents 1012. FIG. 10 shows a representative ML document 1014 in this corpus that includes a part-of-interest 1016. The part-of-interest may 1016 may refer to any identifiable portion of the ML document 1014, such as a menu section, title section, comment field, data-entry field, etc. The identifiable section may be associated with particular kinds of HTML elements, particular kinds of keywords, etc. In the example of FIG. 1, the part-of-interest 1016 corresponds to the link description 118', associated with the link 118 that appears in the web page 108.

Further assume that this part-of-interest 1016 has a label 1018 that identifies its classification category. For example, the label 1018 may specify the type of content conveyed by the part-of-interest 1016, or the type of content that is otherwise associated with the part-of-interest 1016. For example, the label 1018 may indicate that the part-of-interest 1016 contains information that pertains to an event. This label can be formulated using any level of granularity. For example, the label 1018 can generally specify that the part-of-interest 1016 contains event-related information. Or the label 1018 can indicate that the part-of-interest 1016 contains information regarding a particular aspect of the event, such as the venue of an event. Or the label can indicate that the label contains information regarding a particular individual event, and so on. Similarly, the label 1018 may indicate that the part-of-interest 1016 contains information regarding a product, or a particular aspect of a product, or a specific individual product item. Or the label 1018 may indicate that the part-of-interest 1016 contains information regarding a particular media item, or a particular aspect of a media item, or a specific media title. Or the label 1018 may indicate that the part-of-interest 1016 contains contact information, or a specific field of contact information, or a specific name, and so on.

Alternatively, or in addition, the label 1018 can be used to classify the role that the part-of-interest 1016 serves in the web page associated with the ML document 1014. For example, the label 1018 can specify that the part-of interest 1016 pertains to a menu of the web page, a comment section of the web page, a login section of the web page, and so on.

The part-of-interest 1016 has one or more features 1020 that identify its characteristics. As noted above, some features may correspond to text that appears in the web page. Other features may correspond to parts of the ML document 1014 that do not have direct textual counterparts in the ML document 1014.

The dictionary-creating system 1010 operates by identifying a block-of-interest 1022 in the ML document 1014. The block-of-interest 1022 is a region that encompasses the part-of-interest 1016, and which has a prescribed relation to the part-of-interest 1016. For example, the block-of-interest 1022 may be defined as the ML content that encompasses a prescribed number of parent nodes in the ML document 1016, relative to a node (or nodes) associated with the part-of-interest 1016. The dictionary-creating system 1010 then identifies descriptive terms associated with predetermined prefixes that appear in the block-of-interest 1022. In the example of FIG. 10, the block-of-interest 1022 includes the descriptive terms that FIG. 10 generically refers to as "term1," "term2," and "term3." Finally, the dictionary-creating system 1010 generates a dictionary resource 1024 that identifies the descriptive terms that are most commonly associated with each type of label.

An example-generating component 1026 performs the same tasks as the example-generating component 604 of FIG. 6, but with respect to parts-of-interest, not just links. That is, the example-generating component 1026 uses the dictionary resource 1024 to automatically apply labels to parts-of-interest that appear in the ML documents of another corpus of ML documents (in a data store 1028). The example-generating component 1026 performs this task for each part-of-interest by: (1) locating the part-of-interest in a particular ML document; (2) identifying the descriptive terms within a prescribed vicinity of the part-of-interest that has been located; and (3) using the dictionary resource 1024 as a lookup tool to find the label associated with the identified descriptive terms. The example-generating component 1026 next identifies the features associated with the part-of-interest. Finally, the example-generating component 1026 creates a training example for this part-of-interest that specifies at least: (1) the label associated with the part-of-interest; and (2) the features associated with the part-of-interest. A data store 1030 stores all of the training examples produced in the above-described manner. As noted with respect to FIG. 6, the example-generating component 1026 can optionally selectively restrict the training examples on a host-related and/or class-related basis to prevent any website or group of websites from unduly influencing the interpretation of descriptive terms.

A training component 1032 produces the classification model 1004 based on the training examples in the data store 1030. The classification model 1004 is configured to map features associated with a part-of-interest in an ML document to an appropriate label associated with the part-of-interest.

Now referring to the application phase 1006, assume that the input ML document 1008 includes a particular part-of-interest 1034. A part-analyzing system 1036 operates in the same manner as the LAS 104 to assign a label 1038 to the part-of-interest 1034. That is, the part-analyzing system 1036 (which is the counterpart of the LAS 104 shown in FIG. 1) extracts features 1040 associated with the part-ofinterest 1034, and then uses the classification model 1004 to map feature information associated with the features 1040 to the label 1038.

An application system 1042 performs any application-specific action based on the labeled part-of-interest 1034. For example, the application system 1042 can use the labeled part-of-interest 1034 to affect the way it renders the web page associated with the ML document 1008. For instance, the application system 1042 can disable a particular part of the web page based on information conveyed by the label 1038. Or the application system 1042 can load a particular browser tool (e.g., a widget) based on information conveyed by the label 1038, and so on.

B. Illustrative Processes

FIGS. 11-16 show processes that explain the operation of the various computing systems of Section A in flowchart form. Since the principles underlying the operation of the computing systems have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

FIG. 11 describes a process 1102 for controlling actions of an application by classifying web page links. In block 1104, the link-analyzing system (LAS) 104 obtains a markup language (ML) document 106 of a given web page 108 that contains a link 118 that includes destination address of a network-accessible resource. In block 1106, the LAS 104 obtains parsed contents by parsing the ML document. In block 1108, the LAS 104 identifies address content from the parsed contents, the address contents corresponding to at least a portion of a destination address. In block 1110, the LAS 104 identifies text from the parsed contents that has a prescribed relation to the link 118, to produce identified text that is not part of the destination address of the link. In block 1112, the LAS 104 produces feature information that describes a combination of at least the address content and the identified text. In block 1114, the LAS 104 maps the feature information to a classification assessment using the machine-trained classification model 904, the classification assessment including a classification category of the link 118 and a confidence level associated therewith. In block 1116, the computing environment 102 performs an application-specific action directed to the link that is based on the classification assessment. In some implementations, the application is a crawling application, and the application-specific action involves controlling access to the network-accessible resource based on the classification assessment. This application-specific control operation can be implemented by the LAS 104 and/or the crawling engine 120 and/or some other component of the computing environment 102.

Figures 12, 13:
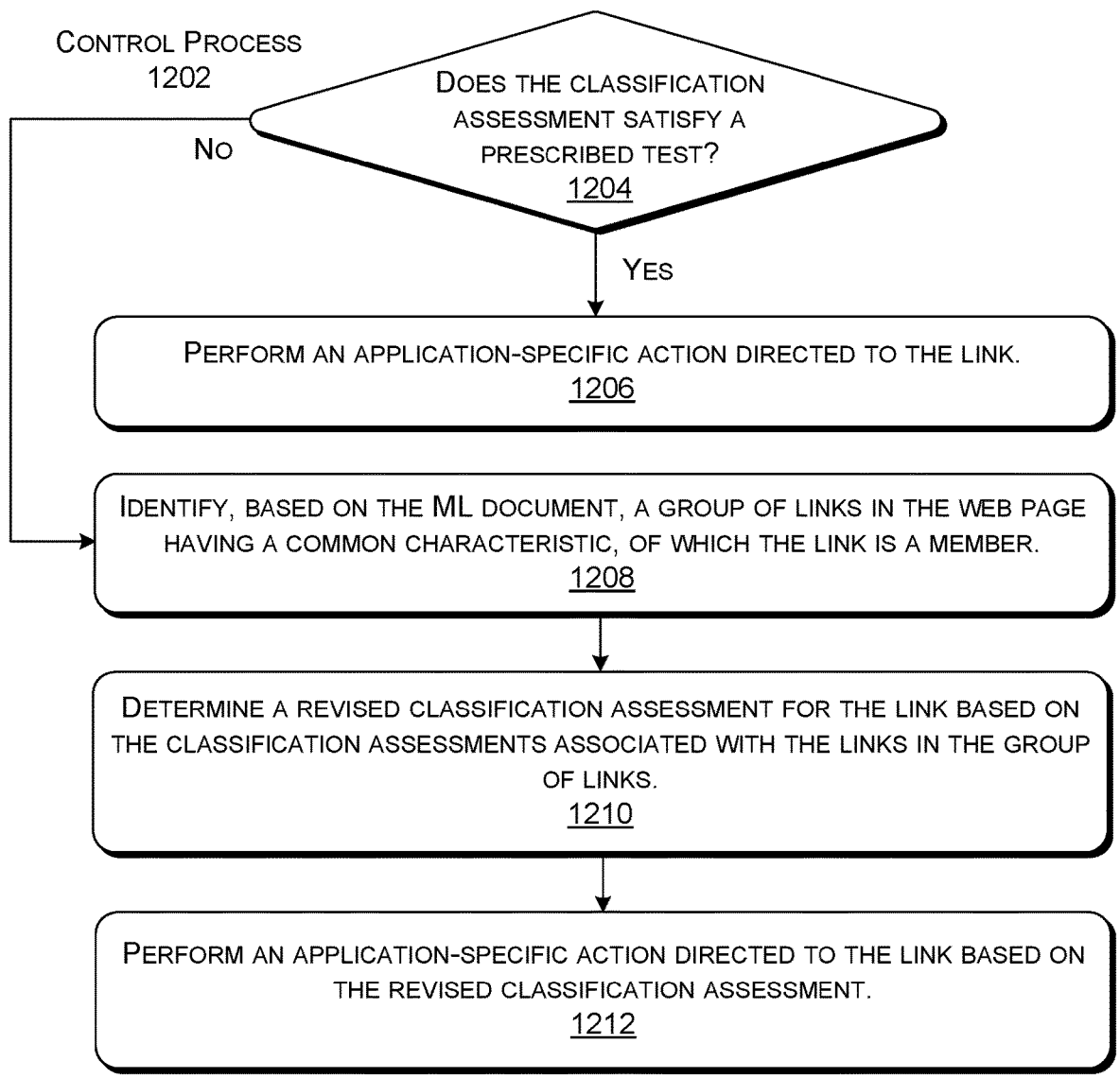
FIG. 12 is an example of a process by which the computing environment of FIG. 1 uses a classification assessment to control the operation of an application, such as a crawling engine application.
FIG. 13 is an example of a process by which the computing environment of FIG. 1 can build a dictionary resource.

FIG. 12 describes a control process 1202 implemented by control logic for controlling actions by an application, in response to the classification assessment made by the LAS 104. In some implementations, the control logic can be implemented by the LAS 104 and/or the crawling engine 120. In block 1104, the control logic determines whether the classification assessment satisfies a prescribed test. Depending on the answer to this determination, the control logic carries out either a first control process (for the answer "yes") or a second process (for the answer of "no").

In the first control process, in block 1206, the control logic performs an application-specific action directed to the link 118. For example, the action-specific action may involving activating the link 118 and accessing the network-accessible resource (to which the destination address of the link 118 points). In the second control process, in block 1208, the control logic identifies, based on the ML document 106, a group of links in the web page 108 having a common characteristic, of which the link 118 is a member. In block 1210, the control logic determines a revised classification assessment for the link 118 based on the classification assessments associated with the links in the group of links. In block 1212, the control logic performs an application-specific action based on the revised classification assessment. For example, the application-specific action invoked in block 1212 may involve controlling access to the network-accessible resource based on the revised classification assessment.

FIG. 13 shows a process 1302 by which the dictionary-creating system 502 of FIG. 5 produces the dictionary resource 504. More specifically, in block 1304, the dictionary-creating system 502 produces the dictionary resource 504. The dictionary resource 504 specifies a plurality of classification categories, and, for each given classification category, a set of terms that are used by web page authors to express markup language content pertaining to the given classification category.

FIG. 14 shows a process 1402 that the training system 140 uses to produce the classification model 904. In block 1404, the training system 140 uses the dictionary resource 504 to automatically assign labels to links described in a corpus of ML documents, each label identifying a particular classification category. In block 1406, the training system 140 extracts feature information for each link that is labeled. In block 1408, the training system 140 produces training examples for the links described in the corpus of ML documents, the training examples including at least the labels and the feature information that has been extracted. In block 1410, the training system 140 trains the classification model based on the training examples.

Figure 15:
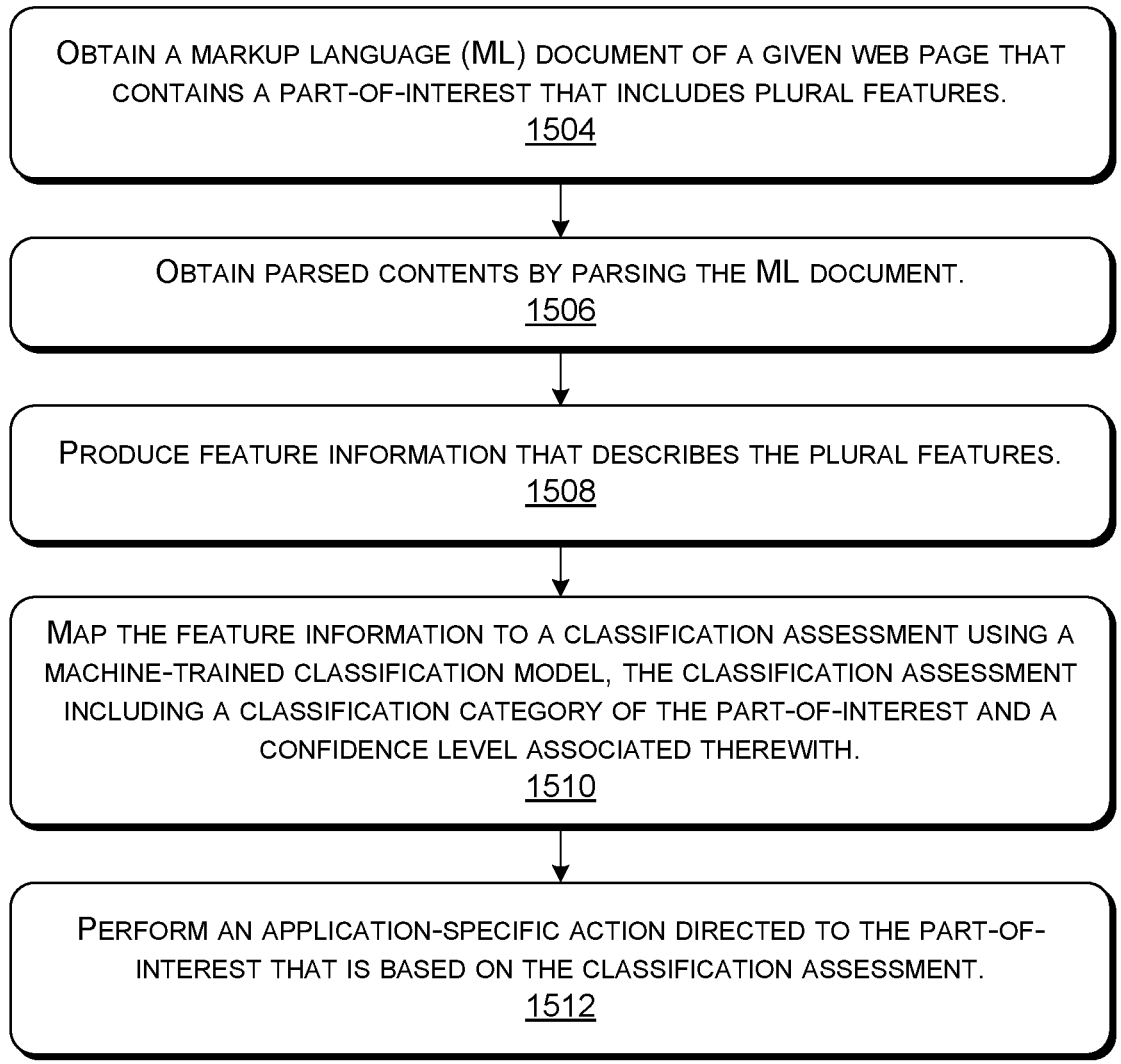
FIG. 15 shows an example of a process by which the part-analyzing system of FIG. 10 applies labels to ML documents.

FIG. 15 shows a process 1502 that describes one implementation of the systems shown in FIG. 10. In block 1504, the part-analyzing system 1036 obtains a markup language (ML) document 1008 of a given web page that contains the part-of-interest 1034 that includes the plural features 1040. In block 1506, the part-analyzing system 1036 obtains parsed contents by parsing the ML document 1008. In block 1508, the part-analyzing system 1036 produces feature information that describes the plural features 1040. In block 1510, the part-analyzing system 1036 maps the feature information to a classification assessment using the machine-trained classification model 1004, the classification assessment including a classification category of the part-of-interest 1034 and a confidence level associated therewith. In block 1512, the application system 1042 performs an application-specific action directed to the part-of-interest 1034 that is based on the classification assessment.

Figures 16, 17:
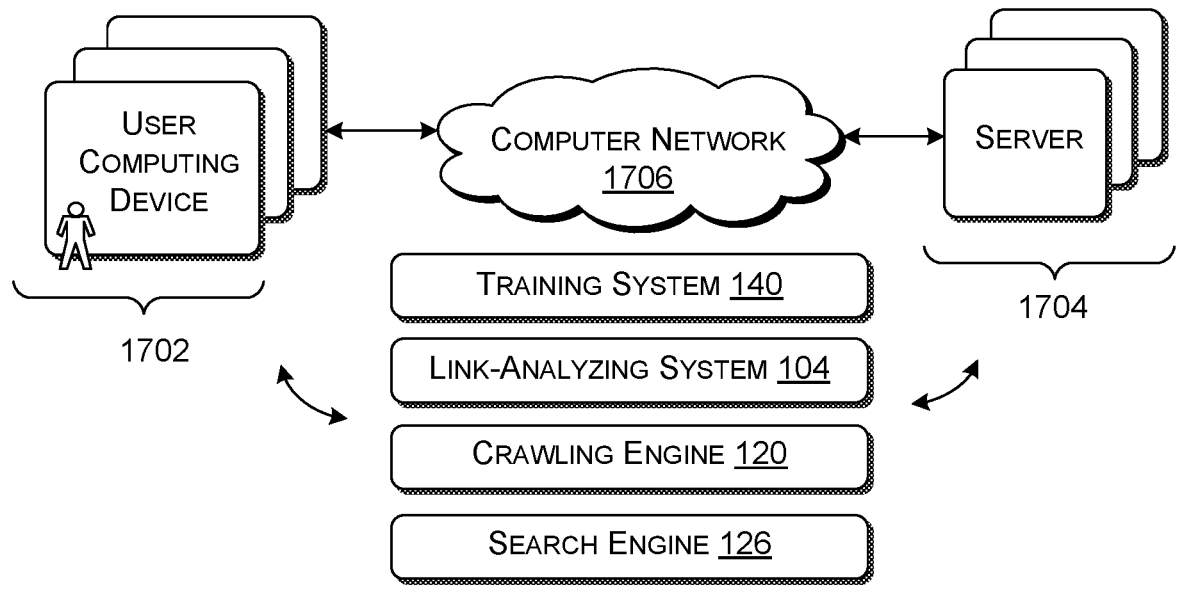
FIG. 16 shows an example of a process by which a training phase described in FIG. 10 produces a machine-trained classification model.
FIG. 17 shows computing equipment that can be used to implement the systems shown in FIG. 1.

FIG. 16 shows a process 1602 for training the machine-trained model 1004, in the context of the systems shown in FIG. 10. In block 1604, the example-generating component 1026 automatically applies labels to parts-of-interest in a corpus of ML documents using the dictionary resource 1024, to produce labeled ML documents. In block 1606, the training component 1032 trains the classification model 1004 based on the labeled ML documents.

C. Representative Computing Functionality

FIG. 17 shows an example of computing equipment that can be used to implement any of the computing systems summarized above. The computing equipment includes a set of user computing devices 1702 coupled to a set of servers 1704 via a computer network 1706. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1706 can be implemented as a local area network, a wide area network (e.g., the Internet), one or more point-to-point links, or any combination thereof.

FIG. 17 also indicates that the LAS 104 (and the part-analyzing system 1036), the crawling engine 120 (and the post-processing engine 122), the search system 126, and any aspect(s) of the training systems (140, 1026, 1032, etc.) can be spread across the user computing devices 1702 and/or the servers 1704 in any manner. For instance, in one case, the search system 126 is entirely implemented by one or more of the servers 1704. Each user may interact with the servers 1704 via a browser application or other programmatic interface provided by a user computing device. In another case, the search system 126 is entirely implemented by a user computing device in local fashion, in which case no interaction with the servers 1704 is necessary. In another case, the functionality associated with the search system 126 is distributed between the servers 1404 and each user computing device in any manner.

Figure 18:
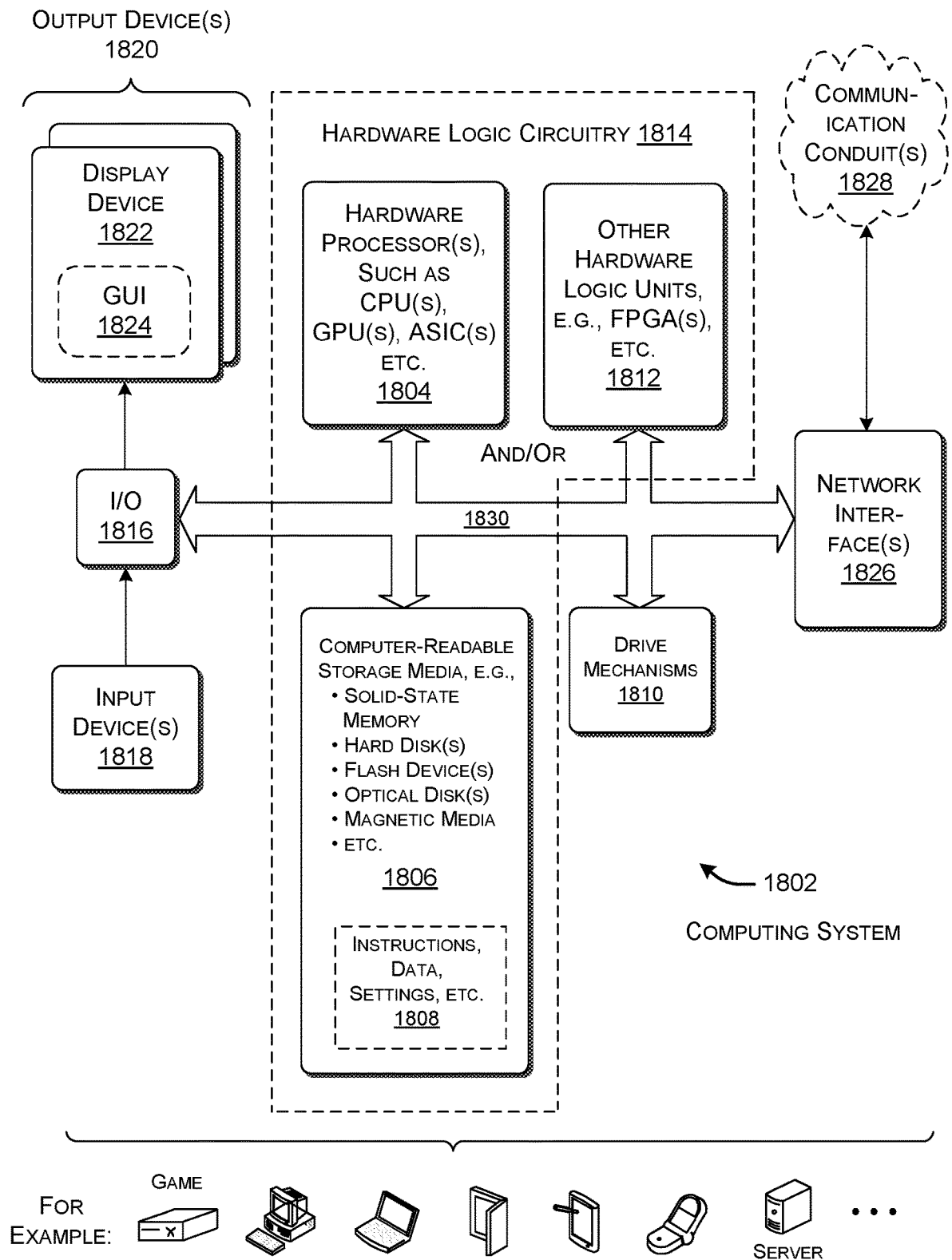
FIG. 18 shows an illustrative type of computing system that can be used to implement any aspect of the features shown in the foregoing drawings.

FIG. 18 shows a computing system 1802 that can be used to implement any aspect of the mechanisms set forth in the above-described figures. For instance, the type of computing system 1802 shown in FIG. 18 can be used to implement any user computing device or any server shown in FIG. 17. In all cases, the computing system 1802 represents a physical and tangible processing mechanism.

The computing system 1802 can include one or more hardware processors 1804. The hardware processor(s) 1804 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1802 can also include computer-readable storage media 1806, corresponding to one or more computer-readable media hardware units. The computer-readable storage media 1806 retains any kind of information 1808, such as machine-readable instructions, settings, data, etc. Without limitation, the computer-readable storage media 1806 may include one or more solid-state devices, one or more magnetic hard disks, one or more optical disks, magnetic tape, and so on. Any instance of the computer-readable storage media 1806 can use any technology for storing and retrieving information. Further, any instance of the computer-readable storage media 1806 may represent a fixed or removable unit of the computing system 1802. Further, any instance of the computer-readable storage media 1806 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals in transit.

The computing system 1802 can utilize any instance of the computer-readable storage media 1806 in different ways. For example, any instance of the computer-readable storage media 1806 may represent a hardware memory unit (such as Random Access Memory (RAM)) for storing transient information during execution of a program by the computing system 1802, and/or a hardware storage unit (such as a hard disk) for retaining/archiving information on a more permanent basis. In the latter case, the computing system 1802 also includes one or more drive mechanisms 1810 (such as a hard drive mechanism) for storing and retrieving information from an instance of the computer-readable storage media 1806.

The computing system 1802 may perform any of the functions described above when the hardware processor(s) 1804 carry out computer-readable instructions stored in any instance of the computer-readable storage media 1806. For instance, the computing system 1802 may carry out computer-readable instructions to perform each block of the processes described in Section B.

Alternatively, or in addition, the computing system 1802 may rely on one or more other hardware logic units 1812 to perform operations using a task-specific collection of logic gates. For instance, the hardware logic unit(s) 1812 may include a fixed configuration of hardware logic gates, e.g., that are created and set at the time of manufacture, and thereafter unalterable. Alternatively, or in addition, the other hardware logic unit(s) 1812 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 18 generally indicates that hardware logic circuitry 1814 includes any combination of the hardware processor(s) 1804, the computer-readable storage media 1806, and/or the other hardware logic unit(s) 1812. That is, the computing system 1802 can employ any combination of the hardware processor(s) 1804 that execute machine-readable instructions provided in the computer-readable storage media 1806, and/or one or more other hardware logic unit(s) 1812 that perform operations using a fixed and/or programmable collection of hardware logic gates. More generally stated, the hardware logic circuitry 1814 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1814 that performs a particular function or combination of functions.

In some cases (e.g., in the case in which the computing system 1802 represents a user computing device), the computing system 1802 also includes an input/output interface 1816 for receiving various inputs (via input devices 1818), and for providing various outputs (via output devices 1820). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1822 and an associated graphical user interface presentation (GUI) 1824. The display device 1822 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1802 can also include one or more network interfaces 1826 for exchanging data with other devices via one or more communication conduits 1828. One or more communication buses 1830 communicatively couple the above-described units together.

The communication conduit(s) 1828 can be implemented in any manner, e.g., by a local area computer network, a wide area computer network (e.g., the Internet), point-to-point connections, etc., or any combination thereof. The communication conduit(s) 1828 can include any combination of hardwired links, wireless links, routers, gateway functionality, name servers, etc., governed by any protocol or combination of protocols.

FIG. 18 shows the computing system 1802 as being composed of a discrete collection of separate units. In some cases, the collection of units corresponds to discrete hardware units provided in a computing device chassis having any form factor. FIG. 18 shows illustrative form factors in its bottom portion. In other cases, the computing system 1802 can include a hardware logic unit that integrates the functions of two or more of the units shown in FIG. 1. For instance, the computing system 1802 can include a system on a chip (SoC or SOC), corresponding to an integrated circuit that combines the functions of two or more of the units shown in FIG. 18.

The following summary provides a non-exhaustive set of illustrative examples of the technology set forth herein.

(A1) According to a first aspect, some implementations of the technology described herein include a method (e.g., the processes 1102 and 1202) for controlling actions taken by an application (e.g., 132). The method includes obtaining (e.g., 1104) a markup language (ML) document (e.g., 106) of a given web page (e.g., 108) that contains a link (e.g., 118) that includes a destination address of a network-accessible resource; obtaining (e.g., 1106) parsed contents by parsing the ML document; identifying (e.g., 1108) address content from the parsed contents, the address contents corresponding to at least a portion of the destination address; identifying (e.g., 1110) text from the parsed contents that has a prescribed relation to the link, to produce identified text that is not part of the destination address of the link; producing (e.g., 1112) feature information that describes a combination of at least the address content and the identified text; mapping (e.g., 1114) the feature information to a classification assessment using a machine-trained classification model (e.g., 904), the classification assessment describing a classification category of the link and a confidence level associated therewith; determining (e.g., 1204) that the classification assessment satisfies a prescribed test; and, performing (e.g., 1206) an application-specific action directed to the link that is based on said determining.

The method of (A1) is technically advantageous because it enables the application to take resource-efficient actions based on classification assessments. For example, in the non-limiting context of a crawling operation, the method of (A1) enables the crawling engine 120 to selectively crawl those links that are most likely to yield a comparatively large number of links. By doing so, the method can increase the number of meaningful links it discovers within a prescribed amount of time and allotted computing resources. Any downstream application also benefits from the improvements made to the crawling operation. For example, the search system 126 leverages the method to increase the comprehensiveness of its search index 124, and to improve the timing at which the search index 124 captures information about new and modified web pages (A2) According some implementations of the method of A1, the destination address of the link includes first address information followed by second address information. The address content that is identified includes the second address information.

(A3) According some implementations of any of the methods of A1-A2, the identified text includes anchor text associated with the link that appears in the web page when the web page is rendered by a browser application.

(A4) According some implementations of any of the methods of A1-A3, the identified text includes header information in the ML document that precedes a description of the link in the ML document, or is part of the description of the link.

(A5) According some implementations of any of the methods of A1-A4, the operation of producing the feature information includes generating a sequence of tokens based on the address content and the identified text.

(A6) According some implementations of the method of A5, the operation of generating a sequence includes: generating a first sequence of tokens that describe the address content using a first tokenizer that has been trained on a corpus of destination address information; generating a second sequence of tokens that describe the identified text using a second tokenizer that has been trained on a corpus of text other than destination address information; and combining the first sequence of tokens with the second sequence of tokens.

(A7) According some implementations of any of the methods of A1-A6, the application is a crawling application. The application-specific action involves activating the destination address of the given web page and accessing the network-accessible resource.

(A8) According some implementations the method of A7, the prescribed test makes the determination to crawl the link based, at least in part, on the classification category specified by the classification assessment, wherein the method is more likely to invoke a crawling operation for some classification categories compared to other classification categories.

(A9) According some implementations of the method of A8, the prescribed test also makes the determination to crawl the link based on the confidence level associated with the classification assessment.

(A10) According some implementations of the method of A8, a set of possible classifications includes at least any two of: a content classification that is used to identify links that point to content-bearing web pages; a navigation classification that is used to identify links that enable navigation within websites; a comments classification that is used to identify links that appear in user comments found on web pages, and/or which otherwise have a role associated with the comments; a profile classification that is used to identify links that point to user profile information; a social classification that is used to identify links that point to social network websites; a calendar classification that is used to identify links contained within electronic calendars and/or which point to information within the electronic calendars; and/or a login classification that is used to identify links that point to program functionality that enables users to enter credential information.

(A11) According some implementations of any of the methods of A1-A10, the above-referenced given web page is a first web page, the link is a first link, the ML document is a first ML document, and the classification assessment is a first classification assessment. The method is repeated for a second ML document associated with a second web page having a second link, to produce a second classification assessment for the second link, wherein the second classification assessment fails to satisfy the prescribed test. The method further includes: identifying, based on the second ML document, a group of links in the second web page having a common characteristic, of which the second link is a member; determining a revised classification assessment for the second link based on classification assessments associated with the links in the group of links; and performing another application-specific action directed to the second link that is based on said determining of the revised classification assessment.

(A12) According some implementations of the method of A11, the operation of determining a revised classification considers only classification assessments having confidence levels above a prescribed threshold.

(A13) According some implementations of any of the methods of A1-A12, the classification model is trained by: producing a dictionary resource, the dictionary resource specifying a plurality of classification categories, and, for each given classification category, a set of terms that are used by web page authors to express markup language content pertaining to the given classification category; using the dictionary resource to automatically assign labels to links described in a corpus of ML documents, each label identifying a particular classification category; extracting feature information for each link that is labeled; producing training examples for the links described in the corpus of ML documents, the training examples including at least the labels and the feature information that has been extracted; and training the classification model based on the training examples.

(A14) According some implementations of the method of A13, the operation of using the dictionary resource involves assigning a particular label to a particular link that is described in a particular ML document upon concluding that a descriptive term associated with the particular label is present in the particular ML document, and has a prescribed relation to a description of the particular link within the particular ML document.

(A15) According some implementations of the method of A13, the method further includes restricting an amount of training examples for each website and for each classification category.

(B1) According to a second aspect, some implementations of the technology described herein include a method (e.g., the process 1102) for controlling actions taken by an application (e.g., 132). The method includes: obtaining (e.g., 1104) a markup language (ML) document (e.g., 106) of a given web page (e.g., 108) that contains a link (e.g., 118) that includes a destination address of a network-accessible resource; obtaining (e.g., 1106) parsed contents by parsing the ML document; identifying (e.g., 1108) address content from the parsed contents, the address contents corresponding to at least a portion of the destination address; identifying (e.g., 1110) text from the parsed contents that has a prescribed relation to the link, to produce identified text that is not part of the destination address of the link; producing (e.g., 1112) feature information that describes a combination of at least the address content and the identified text; mapping (e.g., 1114) the feature information to a classification assessment using a machine-trained classification model (e.g., 904), the classification assessment including a classification category for the link and a confidence level associated therewith; and performing (e.g., 1116) an application-specific action directed to the link that is based on the classification assessment. The method of B1 has technical advantages that are related to that set forth for the method of A1.

(B2) According some implementations of the method of B1, the destination address of the link includes first address information followed by second address information. The address content that is identified includes the second address information. Further, the identified text includes anchor text associated with the link that appears in the web page when the web page is rendered by a browser application.

(B3) According to some implementations of the method of B1, the application is a crawling application, and the application-specific action involves controlling access to the network-accessible resource associated with the destination address based on the classification assessment. The operation of controlling is performed based on control logic that implements at least a first control process and a second control process. The first control process involves: determining that the classification assessment satisfies a prescribed test; and, in response to said determining, activating the link and accessing the network-accessible resource. The second control process involves: determining that the classification assessment fails to satisfy the prescribed test; in response to said determining that the classification assessment fails to satisfy the prescribed test, identifying, based on the ML document, a group of links in the web page having a common characteristic, of which the link is a member; determining a revised classification assessment for the link based on classification assessments associated with the links in the group of links; and controlling access to the network-accessible resource based on the revised classification assessment.

(C1) According to a third aspect, some implementations of the technology described herein include a method (e.g., the processes 1502 and 1602) for controlling actions taken by an application (e.g., 132). The method includes: obtaining (e.g., 1504) a markup language (ML) document (e.g., 106) of a given web page (e.g., 108) that contains a part-of-interest (e.g., 118) that includes plural features; obtaining (e.g., 1506) parsed contents by parsing the ML document; producing (e.g., 1508) feature information that describes the plural features; mapping (e.g., 1510) the feature information to a classification assessment using a machine-trained classification model (e.g., 1004), the classification assessment including a classification category of the part-of-interest and a confidence level associated therewith; and performing (e.g., 1512) an application-specific action directed to the part-of-interest that is based on the classification assessment. The machine-trained classification model is trained based on a corpus of ML documents, using a training process (e.g., 1602) that includes: automatically applying (e.g., 1604) labels to parts-of-interest in the corpus of ML documents using a dictionary resource (e.g., 1024), to produce labeled ML documents; and training (e.g., 1606) the classification model based on the labeled ML documents.

The method of C1 has technical advantages that are related to that set forth for the method of A1.

(C2) According to some implementations of the method C1, the dictionary resource is produced by identifying descriptive terms that are used in prescribed proximity to parts-of-interest having different classification categories within another corpus of ML documents, the dictionary resource associating groups of descriptive terms with the respective classification categories.

In yet another aspect, some implementations of the technology described herein include a computing system (e.g., computing system 1802) having hardware logic circuitry (e.g., 1814) that is configured to perform any of the methods described herein (e.g., any individual method of the methods of A1-A15, B1-B3, and C1-C2).

In yet another aspect, some implementations of the technology described herein include a computer-readable storage medium for storing computer-readable instructions. The computer-readable instructions, when executed by one or more hardware processors (e.g., 1804), perform any of the methods described herein (e.g., any individual method of the methods of A1-A15, B1-B3, and C1-C2).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1514 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, using a computing system, for controlling a crawling engine, comprising automated operations of:
    obtaining a markup language (ML) document of a given web page that contains a link that includes a destination address of a network-accessible resource, the web page being hosted by one or more servers, the web page and the network-accessible resource being accessible via a computer network;
    obtaining parsed contents by parsing the ML document;
    identifying address content from the parsed contents, the address content corresponding to at least a portion of the destination address;
    identifying text from the parsed contents that has a prescribed relation to the link, to provide identified text that is not part of the destination address of the link;
    producing feature information that describes a combination of at least the address content and the identified text;
    mapping the feature information to a classification assessment using a machine-trained classification model, the classification assessment including a classification category for the link and a confidence level associated therewith;
    determining that the classification assessment fails to satisfy a prescribed test;
    in response to said determining that the classification assessment fails to satisfy the prescribed test, identifying, based on the ML document, a group of links in the web page having a common characteristic, of which the link is a member;
    determining a revised classification assessment for the link based on classification assessments associated with links in the group of links;
    based on the revised classification assessment, using the crawling engine to access the network-accessible resource over the computer network by activating the destination address of the link; and
    producing an index entry for the network-accessible resource that is accessed and adding the index entry to a search index provided by a search system.

2. The method of claim 1, wherein the destination address of the link includes first address information followed by second address information, and wherein the address content that is identified includes the second address information.

3. The method of claim 1, wherein the identified text includes anchor text associated with the link that appears in the web page when the web page is rendered by a browser application.

4. The method of claim 1, wherein the identified text includes header information in the ML document that precedes a description of the link in the ML document, or is part of the description of the link.

5. The method of claim 1, wherein the prescribed test determines whether to crawl the link based, at least in part, on the classification category specified by the classification assessment, wherein a set of possible classifications includes at least any two of:
- a content classification that is used to identify links that point to content-bearing web pages;
- a navigation classification that is used to identify links that enable navigation within websites;
- a comments classification that is used to identify links that point to comments found on web pages;
- a profile classification that is used to identify links that point to user profile information;
- a social classification that is used to identify links that point to social network websites;
- a calendar classification that is used to identify links contained within electronic calendars and/or which point to event information; and/or
- a login classification that is used to identify links that point to program functionality that enables users to enter credential information.

6. The method of claim 1, wherein said determining a revised classification considers only classification assessments having confidence levels above a prescribed threshold.

7. The method of claim 1, wherein the classification model is trained by:
- producing a dictionary resource, the dictionary resource specifying a plurality of classification categories, and, for each given classification category, a set of terms that are used by web page authors to express markup language content pertaining to the given classification category;
- using the dictionary resource to automatically assign labels to links described in a corpus of ML documents, each label identifying a particular classification category;
- extracting feature information for the links that are labeled;
- producing training examples for the links described in the corpus of ML documents, the training examples including at least the labels and the feature information that has been extracted; and
- training the classification model based on the training examples.

8. The method of claim 7, wherein said using the dictionary resource involves, for a particular ML document:
- identifying a particular link description in the particular ML document associated with a particular link;
- identifying a block of ML content in the particular ML document that includes the particular link description and other content, the block including a part of the particular ML document that includes plural levels and is less than an entirety of the particular ML document;
- identifying one or more descriptive terms that have predetermined prefixes within the identified block; and
- consulting the dictionary resource to identify a classification category that is most closely associated with the one or more descriptive terms, the classification category being associated with a particular label.

9. The method of claim 7, further comprising restricting an amount of training examples for each website and for each classification category.

10. The method of claim 1, wherein the link is a Hypertext Markup Language hyperlink, and wherein the destination address is a uniform resource locator.

11. The method of claim 1, wherein the index entry for the network-accessible resource includes a uniform resource locator of the network-accessible resource along with feature information associated with the network-accessible resource.

12. The method of claim 1, further comprising updating a knowledge structure of a knowledgebase application based on the revised classification assessment.

13. The method of claim 1, wherein the determining a revised classification assessment includes aggregating classification assessments of the links in the group.

14. A computing system for controlling a crawling engine, comprising:
- hardware logic circuitry, the hardware logic circuitry corresponding to: (a) one or more hardware processors that perform automated operations by executing machine-readable instructions stored in a memory, and/or (b) one or more other hardware logic components that perform the operations using a collection of configured logic gates, the automated operations including:
- obtaining a markup language (ML) document of a given web page that contains a link that includes a destination address of a network-accessible resource, the web page being hosted by one or more servers, the web page and the network-accessible resource being accessible via a computer network;
- obtaining parsed contents by parsing the ML document;
- identifying address content from the parsed contents, the address content corresponding to at least a portion of the destination address;
- identifying text from the parsed contents that has a prescribed relation to the link, to produce identified text that is not part of the destination address of the link;
- producing feature information that describes a combination of at least the address content and the identified text;
- mapping the feature information to a classification assessment using a machine-trained classification model, the classification assessment including a classification category for the link and a confidence level associated therewith;
- controlling access by the crawling engine to the network-accessible resource associated with the destination address based on control logic that implements at least a first control process and a second control process,
- in the first control process: determining that the classification assessment satisfies a prescribed test; and, in response to said determining, activating the link and accessing the network-accessible resource via the computer network;
- in the second control process: determining that the classification assessment fails to satisfy the prescribed test; in response to said determining that the classification assessment fails to satisfy the prescribed test, identifying, based on the ML document, a group of links in the web page having a common characteristic, of which the link is a member; determining a revised classification assessment for the link based on classification assessments associated with the links in the group of links; and controlling access to the network-accessible resource via the computer network based on the revised classification assessment; and producing an index entry for the network-accessible resource and adding the index entry to a search index provided by a search system.

15. A computing system of claim 14,
wherein the destination address of the link includes first address information followed by second address information, and wherein the address content that is identified includes the second address information, and
wherein the identified text includes anchor text associated with the link that appears in the web page when the web page is rendered by a browser application.

16. The computing system of claim 14, wherein the link is a Hypertext Markup Language hyperlink, and wherein the destination address is a uniform resource locator.

17. The computing system of claim 14,
wherein the index entry for the network-accessible resource includes a uniform resource locator of the network-accessible resource along with feature information associated with the network-accessible resource.

18. The computing system of claim 14, wherein the determining a revised classification assessment includes aggregating classification assessments of the links in the group.

19. A non-transitory computer-readable storage medium for storing computer-readable instructions, the computer-readable instructions, when executed by one or more hardware processors, performing a method that comprises:
obtaining a markup language (ML) document of a given web page that contains a part-of-interest that includes plural features, the ML document including a hierarchy of levels;
obtaining parsed contents by parsing the ML document;
producing feature information that describes the plural features;
mapping the feature information to a classification assessment using a machine-trained classification model, the classification assessment including a classification category of the part-of-interest and a confidence level associated therewith; and
performing an application-specific action directed to the part-of-interest that is based on the classification assessment,
the machine-trained classification model being trained based on a corpus of ML documents, using a training process that includes:
automatically applying labels to parts-of-interest in the corpus of ML documents using a dictionary resource, to produce labeled ML documents; and
training the classification model based on the labeled ML documents,
the automatically applying including assigning a particular label to a particular part-of interest that is described in a particular ML document by:
identifying a particular description in the particular ML document associated with the particular part-of-interest;
identifying a block of ML content in the particular ML document that includes the particular description and other content, the block including a part of the particular ML document less than an entirety of the ML document that includes a prescribed number of the levels relative to the particular part-of-interest;
identifying one or more descriptive terms that have predetermined prefixes within the identified block; and
consulting the dictionary resource to identify a classification category that is most closely associated with the one or more descriptive terms, the classification category being associated with the particular label.

20. The computer-readable storage medium of claim 19, wherein the dictionary resource is produced by identifying sets of descriptive terms that are used in prescribed proximity to parts-of interest having different respective classification categories within another corpus of ML documents.

* * * * *